US012769589B2

(12) United States Patent
Phanishayee et al.

(10) Patent No.: US 12,769,589 B2
(45) Date of Patent: Oct. 20, 2026

(54) AUTOMATIC LATENCY OPTIMIZATION FOR CPU-BASED DNN SERVING

(71) Applicant: Microsoft Technology Licensing, LLC, Redmond, WA (US)

(72) Inventors: Amar Phanishayee, Seattle, WA (US); Ankit, Boston, MA (US); Deepak Narayanan, Bellevue, WA (US); Mihail Gavril Tarta, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 532 days.

(21) Appl. No.: 18/452,326

(22) Filed: Aug. 18, 2023

(65) Prior Publication Data

US 2025/0060998 A1 Feb. 20, 2025

(51) Int. Cl.
*G06F 9/50* (2006.01)
*G06N 3/04* (2023.01)

(52) U.S. Cl.
CPC .......... *G06F 9/5061* (2013.01); *G06F 9/5011* (2013.01); *G06N 3/04* (2013.01)

(58) Field of Classification Search
CPC ........ G06F 9/5011; G06F 9/5061; G06N 3/04
USPC .......................................................... 718/104
See application file for complete search history.

(56) References Cited

U.S. PATENT DOCUMENTS 10,698,693 B1 * 6/2020 Zhang ...................... G06F 17/12
11,263,052 B2 * 3/2022 Saxena .............. G06Q 30/0206
11,599,798 B2 * 3/2023 Hu ......................... G06N 3/045
11,687,771 B2 * 6/2023 Lee ....................... G06F 9/5016
706/15
2020/0042362 A1 * 2/2020 Cui ...................... G06N 3/0985
2020/0104397 A1 * 4/2020 Fan ........................... G06F 9/52

OTHER PUBLICATIONS

Anonymous Op Op: "CPU Threading and TorchScript Inference—PyTorch 2.0 Documentation", Retrieved from the URL: https://web.archive.org/web/20230723124545/https://pytorch.org/docs/stable/notes/cpu_threading_torchscriptinference.html, Jul. 23, 2023, pp. 1-4.

(Continued)

*Primary Examiner* — Jacob D Dascomb
(74) *Attorney, Agent, or Firm* — NovoTechIP International PLLC

(57) ABSTRACT

Systems and methods for optimizing thread allocation in a model serving system include estimating a batch size for inference requests. An optimal configuration is then determined that defines a number of inference instances, a number of threads per inference instance, and a sub-batch size per inference instance for processing a batch of inference requests of the batch size using intra-operator parallelism that minimizes average per-batch latency. The optimal configuration is determined with reference to a plurality of predetermined model profiles that define single-inference average batch latencies for different combinations of thread counts and batch sizes, the predetermined model profiles being used as input to a dynamic programming algorithm that identifies optimal configurations that minimize the average per-batch latency.

20 Claims, 8 Drawing Sheets

(56) References Cited

OTHER PUBLICATIONS

Bhardwaj, et al., "Packrat: Automatic Reconfiguration for Latency Minimization in CPU-based DNN Serving", Retrieved from URL: https://arxiv.org/pdf/2311.18174, Nov. 30, 2023, pp. 1-14.
International Search Report and Written Opinion received for PCT Application No. PCT/US2024/039454, Oct. 29, 2024, 16 pages.
Li, et al., "AlpaServe: Statistical Multiplexing with Model Parallelism for Deep Learning Serving", arxiv.org, Cornell University Library, 201 Olin Library Cornell University Ithaca, NY 14853, Jul. 19, 2023, pp. 1-13.
Zheng, et al., "Alpa: Automating Inter- and Intra-Operator Parallelism for Distributed Deep Learning", arxiv.org, Cornell University Library, 201 Olin Library Cornell University Ithaca, NY 14853, Jan. 28, 2022, 20 pages.
"Amazon SageMaker for Inference", Retrieved From: https://docs.aws.amazon.com/sagemaker/latest/dg/deploy-model.html, Retrieved Date: Aug. 8, 2023, 7 Pages.
"AMD Ryzen Threadripper Pro 5995WX", Retrieved From: https://www.amd.com/en/product/11786, Aug. 3, 2022, 4 Pages.
"Azure Machine Learning", Retrieved From: https://azure.microsoft.com/en-us/products/machine-learning, Retrieved Date: Aug. 8, 2023, 12 Pages.
"Intel® Architecture Instruction Set Extensions Programming Reference", Retrieved From: https://www.intel.com/content/dam/develop/external/us/en/documents/architecture-instruction-set-extensions-programming-reference.pdf, May 2021, 214 Pages.
"Intel® Xeon Platinum 9282 Processor", Retrieved From: https://www.intel.com/content/www/us/en/products/ sku/194146/intel-xeon-platinum-9282-processor-77m-cache-2-60-ghz/specifications.html, Retrieved Date: Aug. 8, 2023, 4 Pages.
"Launch Script Usage Guide", Retrieved From: https://intel.github.io/intel-extension-for-pytorch/cpu/1.12.0+cpu/tutorials/performance_tuning/launch_script.html, Retrieved Date: Aug. 8, 2023, 15 Pages.
"OpenMP Application Program Interface Version 5.1", Retrieved From: https://www.openmp.org/wp-content/uploads/OpenMP-API-Specification-5-1.pdf, Nov. 1, 2020, 711 Pages.
Kulkarni, Nikhil, "TorchServe", Retrieved From: https://github.com/pytorch/serve, Retrieved Date: Aug. 8, 2023, 5 Pages.
"Triton Inference Server: An Optimized Cloud and Edge Inferencing Solution", Retrieved From: https://github.com/triton-inference-server/server, Retrieved Date: Aug. 8, 2023, 5 Pages.
"Xeon Gold 6142—Intel", Retrieved From: https://en.wikichip.org/wiki/intel/xeon_gold/6142#Frequencies, Apr. 25, 2017, 9 Pages.
Abadi, et al., "TensorFlow: A System for Large-scale Machine Learning", In Proceedings of the 12th USENIX Symposium on Operating Systems Design and Implementation, Nov. 2, 2016, pp. 265-283.
Ali, et al., "BATCH: Machine Learning Inference Serving on Serverless Platforms with Adaptive Batching", In Proceedings of International Conference for High Performance Computing, Networking, Storage and Analysis, Nov. 9, 2020, 15 Pages.
Belay, et al., "IX: A Protected Dataplane Operating System for High Throughput and Low Latency", In Proceedings of the 11th USENIX Symposium on Operating Systems Design and Implementation, Oct. 6, 2014, pp. 49-65.
Bhardwaj, et al., "A Preliminary Performance Model for Optimizing Software Packet Processing Pipelines", In Proceedings of the 8th Asia-Pacific Workshop on Systems, Sep. 2, 2017, 7 Pages.
Chandra, et al., "Parallel Programming in OpenMP", In Published of Morgan Kauffmann, Jan. 1, 2001, 163 Pages.
Chen, et al., "TVM: An Automated End-to-End Optimizing Compiler for Deep Learning", In Proceedings of the 13th USENIX Symposium on Operating Systems Design and Implementation, Oct. 8, 2018, pp. 579-594.
Cho, et al., "Grokking PyTorch Intel CPU Performance from First Principles", Retrieved from: https://pytorch.org/tutorials/intermediate/torchserve_with_ipex.html, Retrieved Date: Aug. 8, 2023, 11 Pages.
Crankshaw, et al., "Clipper: A Low-Latency Online Prediction Serving System", In Proceedings of 14th USENIX Symposium on Networked Systems Design and Implementation, Mar. 27, 2017, pp. 613-627.
Crankshaw, et al., "InferLine: Latency-Aware Provisioning and Scaling for Prediction Serving Pipelines", In Proceedings of the 11th ACM Symposium on Cloud Computing, Oct. 12, 2020, pp. 477-491.
Daghaghi, et al., "Accelerating SLIDE Deep Learning on Modern CPUs: Vectorization, Quantizations, Memory Optimizations, and More", In Proceedings of Machine Learning and Systems, Mar. 6, 2021, 12 Pages.
Devlin, et al., "Bert: Pre-training of deep bidirectional transformers for language understanding", In Repository of arXiv:1810.04805v2, May 24, 2019, 16 Pages.
Dice, et al., "Optimizing Inference Performance of Transformers on CPUs", In repository of Arxiv Code: 2102.06621v3 [cs.CL], Feb. 22, 2021, 10 Pages.
Duplyakin, et al., "The Design and Operation of CloudLab", In Proceedings of USENIX Annual Technical Conference, Jul. 10, 2019, 15 Pages.
Fréville, Arnaud, "The Multidimensional 0-1 Knapsack Problem: An Overview", In European Journal of Operational Research, vol. 155, Issue 1, May 16, 2004.
Gross, Sam, "Small CPU Model Forward Pass Extremely Slow", Retrieved From: https://github.com/pytorch/pytorch/issues/13757, Nov. 9, 2018, 5 Pages.
Hasabnis, Niranjan, "Auto-Tuning TensorFlow Threading Model for CPU Backend", In Proceedings IEEE/ACM Machine Learning in HPC Environments (MLHPC), Nov. 12, 2018, pp. 14-25.
Hazelwood, et al., "Applied Machine Learning at Facebook: A Datacenter Infrastructure Perspective", In Proceedings of IEEE International Symposium on High Performance Computer Architecture, Feb. 24, 2018, pp. 620-629.
He, et al., "Deep Residual Learning for Image Recognition", In Proceedings of the IEEE Conference on Computer Vision and Pattern Recognition, Jun. 27, 2016, pp. 770-778.
Howard, "Server Processors: Choosing the Right Server CPU", Retrieved From: https://community.fs.com/blog/server-processors-choosing-the-right-server-cpu.html, Mar. 30, 2023, 3 Pages.
Kaffes, et al., "Shinjuku: preemptive scheduling for µsecond-scale tail latency", In Proceedings of the 16th USENIX Conference on Networked Systems Design and Implementation, Feb. 26, 2019, 16 Pages.
Kosaian, et al., "Boosting the Throughput and Accelerator Utilization of Specialized CNN Inference Beyond Increasing Batch Size", In Proceedings of International Conference on Machine Learning, Jul. 1, 2021, pp. 5731-5741.
Lévai, et al., "Batchy: Batch-scheduling Data Flow Graphs with Service-level Objectives", In Proceedings of 17th USENIX Symposium on Networked Systems Design and Implementation, Feb. 25, 2020, pp. 633-649.
Lim, et al., "MICA: A Holistic Approach to Fast In-memory Key-value Storage", In Proceedings of the 11th USENIX Conference on Networked Systems Design and Implementation, Apr. 2, 2014, pp. 429-444.
Olston, et al., "TensorFlow-Serving: Flexible, High-Performance ML Serving", In Proceedings of Workshop on ML Systems at NIPS, Dec. 17, 2017, 8 Pages.
Ousterhout, et al., "Shenango: Achieving High CPU Effciency for Latency-sensitive Datacenter Workloads", In Proceedings of 16th USENIX Symposium on Networked Systems Design and Implementation, Feb. 26, 2019, pp. 361-377.
Paszke, et al., "PyTorch: An Imperative Style, High-Performance Deep Learning Library", In Proceedings of the 33rd Conference on Neural Information Processing Systems, Dec. 8, 2019, 12 Pages.
Patterson, et al., "Computer Architecture: A Quantitative Approach", In Published of Morgan Kaufmann, Dec. 1, 1990, 1357 Pages.
Prekas, et al., "ZygOS: Achieving Low Tail Latency for Microsecond-Scale Networked Tasks", In Proceedings of the 26th Symposium on Operating Systems Principles, Oct. 14, 2017, pp. 325-341.
Quinnell, et al., "Floating-Point Fused Multiply-Add Architectures", In Proceedings of the Forty-First Asilomar Conference on Signals, Systems and Computers, Nov. 4, 2007, pp. 331-337.

(56) References Cited

OTHER PUBLICATIONS

Quoc, Len. , "How We Scaled Bert To Serve 1+ Billion Daily Requests on CPUs", Retrieved From: https://medium.com/@quocnle/how-we-scaled-bert-to-serve-1-billion-daily-requests-on-cpus-d99be090db26, May 27, 2020, 19 Pages.
Radford, et al., "Language Models are Unsupervised Multitask Learners", In Journal of OpenAI Blog, vol. 1, Issue 8, Feb. 24, 2019, 24 Pages.
Reinders, James R., "Intel® AVX-512 Instructions", Retrieved From: https://www.intel.com/content/www/us/en/developer/articles/technical/intel-avx-512-instructions.html, Jun. 20, 2017, 3 Pages.
Schöne, et al., "Energy Effciency Features of the Intel Skylake-SP Processor and Their Impact on Performance", In Proceedings of International Conference on High Performance Computing and Simulation, Jul. 15, 2019, pp. 399-406.
Shen, et al., "Nexus: A GPU Cluster Engine for Accelerating DNN-Based Video Analysis", In Proceedings of the 27th ACM Symposium on Operating Systems Principles, Oct. 27, 2019, pp. 332-337.
Shoeybi, et al., "Megatron-Lm: Training Multi-Billion Parameter Language Models Using Model Parallelism", In Repository of arXiv:1909.08053v1, Sep. 17, 2019, 15 Pages.
Szegedy, et al., "Rethinking the Inception Architecture for Computer Vision", In Proceedings of the IEEE Conference on Computer Vision and Pattern Recognition, Jun. 27, 2016, pp. 2818-2826.
Tao, Lv, "Optimization for BERT Inference Performance on CPU", Retrieved From: https://medium.com/apache-mxnet/optimization-for-bert-inference-performance-on-cpu-3bb2413d376c, Aug. 9, 2019, 20 Pages.
Vasilache, et al., "Tensor Comprehensions: Framework-Agnostic High-Performance Machine Learning Abstractions", In Repository of arXiv:1802.04730v1, Feb. 13, 2018, 39 Pages.
Wang, et al., "Exploiting Parallelism Opportunities with Deep Learning Frameworks", In Proceedings of ACM Transactions on Architecture and Code Optimization, Dec. 30, 2020, 23 Pages.
Wang, et al., "Intel Math Kernel Library", Retrieved From: In Publication of Springer, Jan. 1, 2014, pp. 167-188.
Xianyi, et al., "OpenBLAS: An Optimized BLAS Library", Retrieved From: https://www.openblas.net/, Retrieved Date: Aug. 8, 2023, 2 Pages.
Yin, et al., "ParaX: Boosting Deep Learning for Big Data Analytics on Many-Core CPUs", In Journal of the VLDB Endowment, vol. 14, Issue 6, Feb. 1, 2021, pp. 864-877.
International Preliminary Report on Patentability (Chapter I) received for PCT Application No. PCT/US2024/039454, Mar. 5, 2026, 10 pages.

* cited by examiner

AUTOMATIC LATENCY OPTIMIZATION FOR CPU-BASED DNN SERVING

BACKGROUND

Deep neural network (DNN) serving refers to the process of deploying trained DNNs to production environments where they can handle real-time or batch inference requests. The goal of DNN serving is to make the predictions, or inferences, of the trained models available for applications, services, or users to consume. As such, DNN serving is an increasingly important datacenter workload. In these settings, inference requests arrive continuously and must be served in real time. However, it is challenging to design a DNN serving system that is capable of handling high request rates efficiently and with low response latency.

One important technique that is used to improve the latency of DNN serving is intra-operator parallelism. DNN inference involves executing a single forward pass of the model for each inference input. The forward pass consists of a sequence of operations like matrix multiplications, convolutions, vector operations, and activation functions that are executed in a specific order. Intra-operator parallelism refers to the process of dividing each operation into multiple threads that can be executed in parallel across multiple cores. While this method does improve inference latency, testing has shown that as the number threads used to parallelize a batch increases, the improvements in latency that are achieved diminish. Though the exact point and magnitude of diminishing returns may differ, this trend is consistent across different models, batch sizes, and deployments (server used).

Some DNN serving systems allow users the flexibility to specify the number of threads assigned to a model instance. For example, users may choose to create multiple instances of a model being served with each model having a single thread so that batches are processed in parallel in order to maximize throughput. Alternatively, users may choose to allocate all threads on a server to process individual batches using intra-operator parallelism to reduce per-batch latency. Unfortunately, as things stand today with the state-of-the-art systems, users are mainly left choosing between these two extremes. While multi-instance execution will frequently maximize throughput at the expense of latency, relying solely on intra-op parallelism frequently results in neither the best throughput nor the best latency.

What is needed therefore are systems and methods of optimizing and automatically adjusting the allocation of threads for intra-operator parallelism so that latency and throughput are maximized.

SUMMARY

In one general aspect, the instant disclosure presents a data processing system having a processor and a memory in communication with the processor wherein the memory stores executable instructions that, when executed by the processor alone or in combination with other processors, cause the data processing system to perform multiple functions. The function include estimating a batch size for inference requests of the model serving system, the model serving system serving a deep learning model and including a plurality of threads corresponding to a total thread count for processing inferences for the deep learning model; automatically determining, using an optimizer component of the thread optimizer system, a first optimal configuration that defines a number of inference instances, a number of threads per inference instance, and a sub-batch size per inference instance for processing a batch of inference requests of the batch size using intra-operator parallelism with the plurality of threads that minimizes average per-batch latency, the first optimal configuration being determined with reference to a plurality of predetermined model profiles that define single-inference average batch latencies for different combinations of thread counts and batch sizes, the predetermined model profiles being used as input to a dynamic programming algorithm that identifies optimal configurations that minimize the average per-batch latency; and allocating compute resources based on the number of inference instances, the number of threads per inference instance, and the sub-batch size per inference instance indicated by the first optimal configuration.

In yet another general aspect, the instant disclosure presents a method of optimizing thread allocation for a model serving system includes estimating a batch size for inference requests of the model serving system using a thread optimization system of the model serving system, the model serving system serving a deep learning model and including a plurality of threads corresponding to a total thread count for processing inferences for the deep learning model; automatically determining, using an optimizer component of the thread optimizer system, a first optimal configuration that defines a number of inference instances, a number of threads per inference instance, and a sub-batch size per inference instance for processing a batch of inference requests of the batch size using intra-operator parallelism with the plurality of threads that minimizes average per-batch latency, the first optimal configuration being determined with reference to a plurality of predetermined model profiles that define single-inference average batch latencies for different combinations of thread counts and batch sizes, the predetermined model profiles being used as input to a dynamic programming algorithm that identifies optimal configurations that minimize the average per-batch latency; and allocating compute resources based on the number of inference instances, the number of threads per inference instance, and the sub-batch size per inference instance indicated by the first optimal configuration.

In a further general aspect, the instant application describes a non-transitory computer readable medium on which are stored instructions that when executed cause a programmable device to perform functions of estimating a batch size for inference requests of a model serving system using a thread optimization system of the model serving system, the model serving system serving a deep learning model and including a plurality of threads corresponding to a total thread count for processing inferences for the deep learning model; automatically determining, using an optimizer component of the thread optimizer system, a first optimal configuration that defines a number of inference instances, a number of threads per inference instance, and a sub-batch size per inference instance for processing a batch of inference requests of the batch size using intra-operator parallelism with the plurality of threads that minimizes average per-batch latency, the first optimal configuration being determined with reference to a plurality of predetermined model profiles that define single-inference average batch latencies for different combinations of thread counts and batch sizes, the predetermined model profiles being used as input to a dynamic programming algorithm that identifies optimal configurations that minimize the average per-batch latency; and allocating compute resources based on the number of inference instances, the number of threads per inference instance, and the sub-batch size per inference instance indicated by the first optimal configuration.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
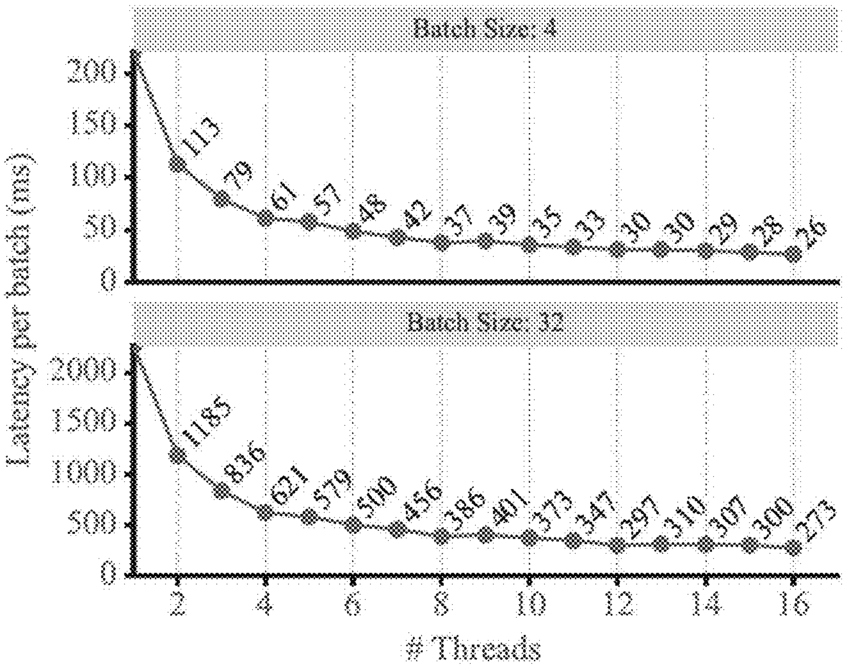
FIG. 1 shows a graph of inference latencies for ResNet-50 with different numbers of threads (T) for intra-operator parallelism with batch size B=4 and 32.

Deep Neural Network (DNN) serving is an increasingly important datacenter workload. DNN serving systems are often used in online services like image and video analytics, speech transcription, text and code completion, chatbots, and more. In these settings, requests arrive continuously and must be served in real time; thus, serving systems must handle high request rates efficiently and with low response latency.

There are many DNN serving systems available today. These systems are designed to use both CPUs and GPUs to execute DNN model inference. GPUs generally provide better throughput than CPUs, but they are often more expensive and power-hungry. They also end up underutilized for inference workloads. Recent CPU advances, like high core counts (56 to 64 cores are common today) and specialized instructions that support lower numerical precision multiplications with higher precision accumulates (e.g., AVX-512, AMX), improve inference performance. Every cloud server comes equipped with such multi-core CPUs and many product groups at large companies already own large fleets of such servers that are now used for CPU-based serving.

DNN inference involves executing a single forward pass of the model for each inference input. The forward pass consists of a sequence of operations like matrix multiplications, convolutions, vector operations, and activation functions that are executed in a specific order. Each request incurs some overhead including data transformations, memory allocations, and data copying. These overheads can be amortized by batching multiple inference inputs and executing them in one forward pass, improving arithmetic intensity and overall performance of the system.

For a request batch, each operator processes a whole input batch to produce a batched output, instead of going through individual operators input-by-input. Typical production DNN serving systems support batched execution. Many of these systems also support adaptive batching for online inference; for example, if a user-configured number of input items have not arrived within a timeout interval, they can send all available items as a batch of inputs for inference right away and not incur further queuing latency. For highly parallelizable operations like matrix multiplications, many cores can execute the operation in parallel to reduce overall execution time. In addition to multicore parallelism, each core can also execute instructions in parallel, called instruction-level parallelism (ILP). ILP is achieved using out-of-order execution of instructions.

As noted above, each inference involves executing a sequence of operations like matrix multiplication, convolutions, or activation functions with vector operations in a specific order. Each operation (e.g., a single matrix multiply) can be broken up and executed in parallel across multiple cores. This is called intra-op parallelism because operators for a single input's inference (or a batch of them) are executed in a parallel fashion. Depending on the implementation, intra-op parallelism is realized through OpenMP or using MKL threads. Optimized libraries like Intel MKL internally use vector instructions to improve performance. By default, OpenMP matches the number of threads it uses to the number of physical cores available on the machine when executing parallel code. However, DNN frameworks like PyTorch and TensorFlow also allow the user to specify the number of threads to use.

Figure 2:
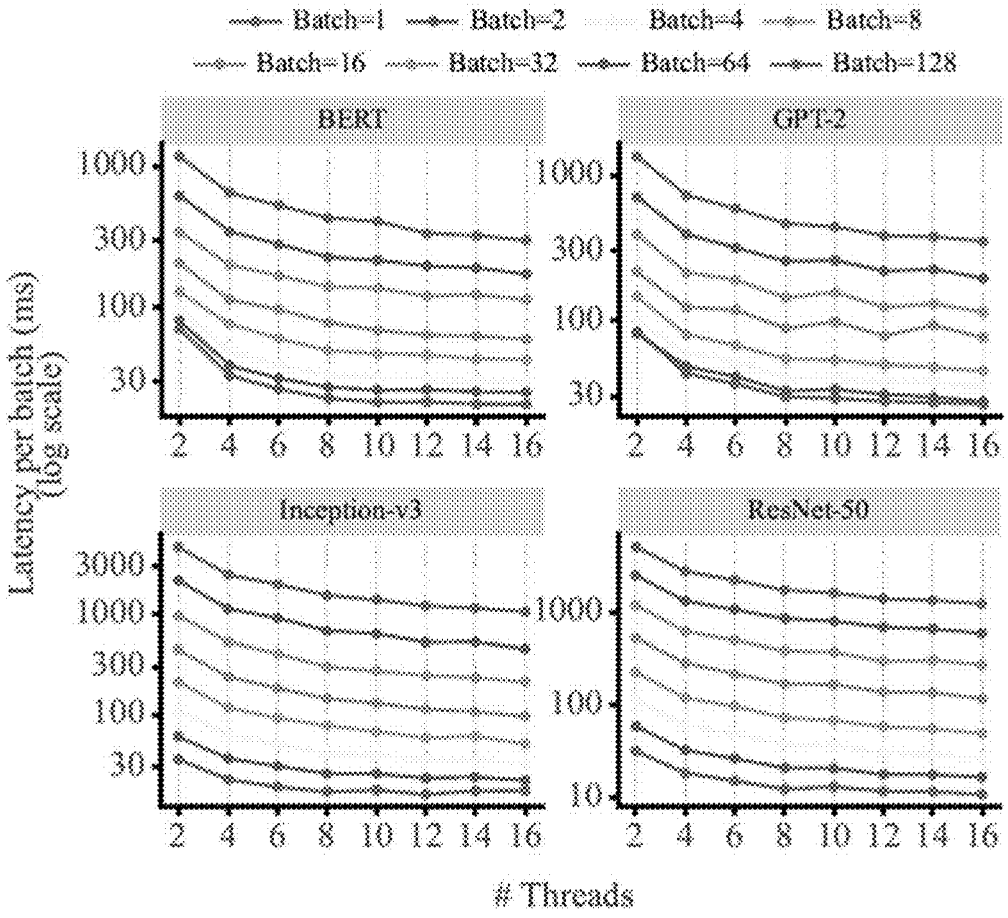
FIG. 2 shows graphs of inference latencies for four different models, BERT, GPT-2, Inception-v3, and ResNet-50 for intra-operator parallelism with different batch sizes.

FIGS. 1 and 2 depict graphs demonstrating the impact of intra-op parallelism on inference performance. FIG. 1 shows the results for ResNet-50 on a single serving instance while varying threads for intra-op parallelism when executing on a batch size of 8 and 32. As an example, for a batch size of 4, increasing the number of threads for intra-op parallelism from 2 to 4 improves latency by 1.85×, but from 8 to 16 results in a 1.4× improvement. Similarly, for batch size 32, going from 2 to 4 threads improves latency by 1.9×, but going from 8 to 16 improves latency only by 1.4×. FIG. 2 shows the results for four different models: ResNet-50, Inception-v3, GPT-2, and BERT. For all these models, intra-op parallelism improves inference throughput and latency, but scaling the number of threads assigned to intra-operator parallelism provides diminishing returns.

Fortunately, serving systems like TorchServe allow users the flexibility to specify the number of threads assigned to serving a model instance. For example, a user might allocate all threads on a server to process individual input batches using intra-op parallelism, with the hope of improving per-batch inference latency. They can also create multiple instances of the model being served, each with a single thread processing batches in parallel, with the hope of improving throughput. Unfortunately, users are mainly left choosing between these two extremes; while multi-instance execution will frequently maximize throughput at the expense of latency, only relying on intra-op parallelism frequently results in neither the best throughput nor the best latency.

To address these technical problems and more, in an example, this description provides technical solutions in the form of a thread optimization system for a DNN server that automatically determines the number of threads that need to be allocated to model instances to minimize inference latency. The thread optimization system is based on the insight that instead of running a single instance of a model with all available threads (which is the default for some systems), running multiple instances each with smaller batch sizes, also referred to as sub-batches, and fewer threads for intra-operator parallelism can provide lower inference latency. For example, FIG. 1 shows that using a total of 16 threads (T) for a ResNet-50 model with a batch (B) of size 32 is sub-optimal (latency of 273 ms). To sidestep the diminishing benefits from intra-op parallelism, a user might try to create one model instance per core and configure their workload to split each batch across the available threads, but this does not minimize latency either. Instead, these measurements suggest that running 8 inference instances (i=8) with 2 threads (t=2) each serving a batch of 4 items (b=4) could lower the latency of the entire batch over either of these configurations (i.e., to 113 ms which is a 2.4× speedup). In short, neither maximizing intra-operator parallelism nor maximizing parallelism across model instances results in the best inference latency. Determining the optimal configuration of (instances, threads, batch) (or ⟨i, t, b⟩ for short) is challenging because it is workload- and ⟨deployment-specific. The optimal configuration depends on the specific model being served, input dimensions like the batch size (which is itself dependent on the request arrival rate), and the hardware (e.g., number of cores, memory bandwidth, etc.). Furthermore, even if a user was able to determine an optimal ⟨i, t, b⟩ configuration, the user would still have to manually recognize when to change configurations and then reconfigure existing serving systems while specifying thread-core affinities appropriately.

The thread optimization system monitors incoming inference requests to select an appropriate batch size B, and transparently and dynamically reconfigures the number of model instances and the intra-op parallelism of each instance to improve average batch latency. In cases where inference request rates change, this configured batch size might need to change as well, triggering re-configuration. The system uses a novel algorithm to dynamically determine the optimal ⟨i, t, b⟩ configuration for models on individual servers given a batch size B. The system does this automatically using a small amount of targeted profiling. From this limited profiling information, the system formulates ⟨i, t, b⟩ configurations that are expected to optimize average batch latency for different batch sizes by solving a 2-dimensional knapsack problem using dynamic programming. This lets the system quickly find configurations that balance intra-operator latency with multi-instance execution without the need for user input and without having to profile all possible configuration combinations.

For a given ⟨T, B⟩, the system tries to choose a configuration that minimizes average per-batch latency while improving throughput compared to using [⟨1, T, B⟩](i.e., a single instance (I) of a model that uses all threads (T) and to process an entire batch (B), also referred to as the "fat" configuration). More specifically, given a server with T threads and incoming inference requests grouped into batches of size B, the system determines a configuration [⟨($i_1$, $t_1$, $b_1$⟩, . . . , ⟨$i_n$, $t_n$, $b_n$⟩] such that $$\sum_{j=1}^{n} i_j \cdot t_j = T \text{ and } \sum_{j=1}^{n} i_j \cdot b_j = B.$$

For the purposes of this disclosure, each combination of i, t, b values will be referred to as an ⟨i, t, b⟩ configuration. In each ⟨$i_j$, $t_j$, $b_j$⟩ configuration, $i_j$ represents the number of model instances of a given type. Each such instance uses $t_j$ threads for intra-op parallelism (i.e., $t_j$ is the degree of intra-operator parallelism for each $i_j$ instance), and $b_j$ represents the batch size processed by each instance is $i_j$.

Once the system determines a new optimal ⟨i, t, b⟩ configuration, the system reconfigures serving instances appropriately without stalling the entire serving system when the serving batch size changes (e.g., when request arrival rate changes), even though this might be infrequent (e.g., order of hours, not seconds). The system includes mechanisms for transitioning between ⟨i, t, b⟩ configurations which enables the system to dynamically reconfigure model instances and threads used for inference, entirely online and without service downtime, so as to optimize inference latency as workloads change. To accomplish this, the system maintains two sets of model instances, one active and one passive, and it reconfigures the passive set with the desired new configuration. It then swaps the two sets, while scaling up the new active set and simultaneously scaling down the old active (now passive) set.

Figure 3:
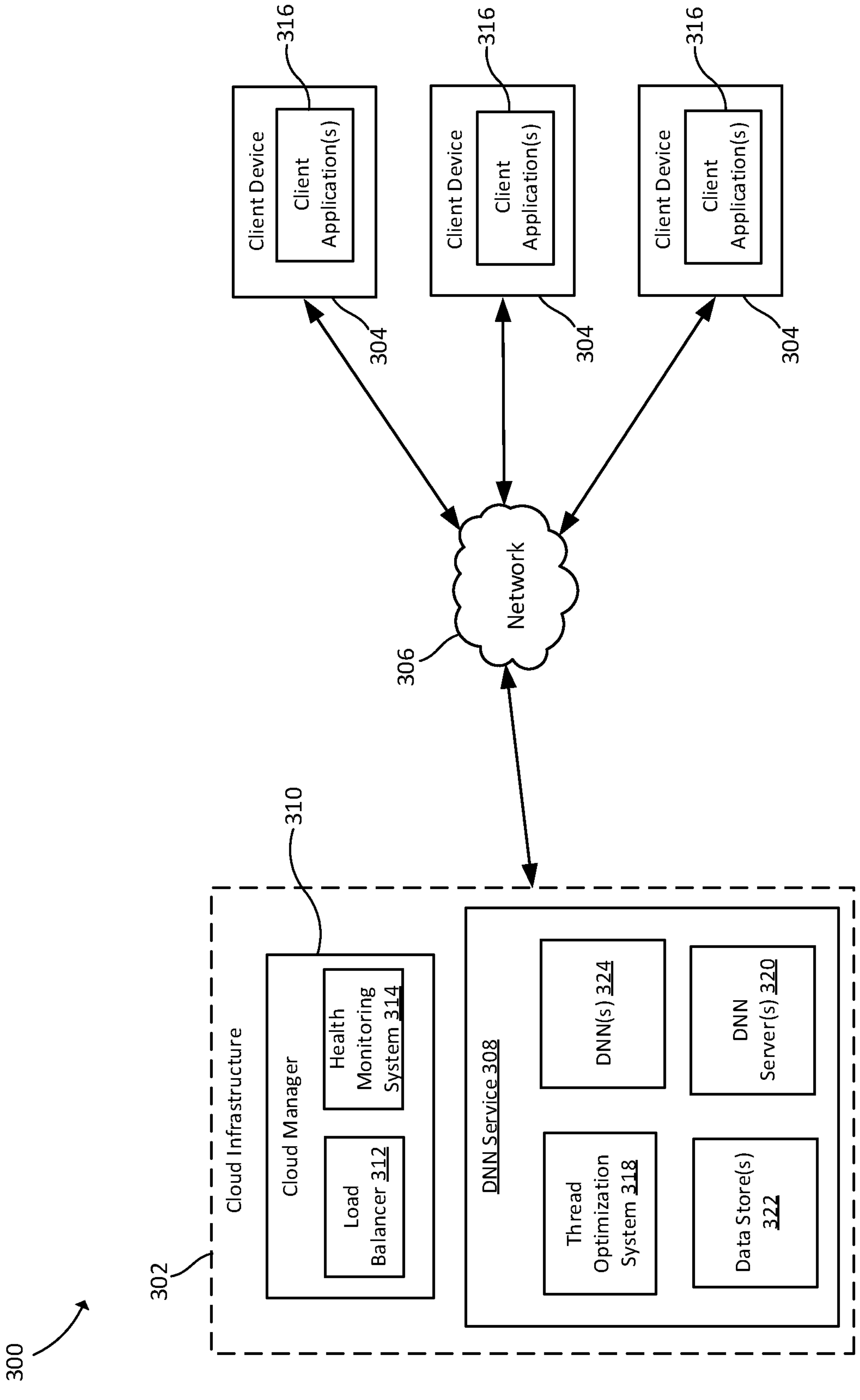
FIG. 3 is a diagram showing an example computing environment in which the techniques disclosed herein may be implemented.

FIG. 3 is a diagram showing an example computing environment 300 in which aspects of the disclosure may be implemented. Computing environment 300 includes cloud infrastructure 302, client devices 304, and a network 306. The network 306 includes one or more wired and/or wireless networks. In embodiments, the network 306 includes one or more local area networks (LAN), wide area networks (WAN) (e.g., the Internet), public networks, private networks, virtual networks, mesh networks, peer-to-peer networks, and/or other interconnected data paths across which multiple devices may communicate.

The cloud infrastructure 302 is configured to provide one or more cloud computing services and/or distributed computing services, including a DNN service 308, to users over the network 306. Cloud infrastructure 302 may provide other services, such as hosting applications, user authentication, file storage, system updates, and the like. Cloud infrastructure 302 includes one or more DNN servers 320 provide computational and storage resources for the DNN service 308 including the servicing of one or more DNNs 324. DNN servers 320 are implemented using any suitable number and type of physical and/or virtual computing resources (e.g., standalone computing devices, blade servers, virtual machines, etc.). Cloud infrastructure 302 may also include one or more data stores 322 for storing data, programs, and the like for implementing and managing the DNN service 108.

Cloud infrastructure 302 includes a cloud manager 310 for managing various aspects of the cloud infrastructure, such as deploying, configuring, and managing physical and/or virtual machines. Cloud manager 310 includes a load balancer 312 for distributing requests and workloads among server farms and/or among servers of a server farm. The load balancer 312 utilizes parameters such as load, number of connections, and server performance, to determine where to distribute the requests and workloads. Cloud manager 310 also includes a health monitoring system 314 configured to monitor the health of physical and virtual resources. and identify faulty components so that remedial action can be taken.

Client devices 304 enable users to access the services provided by the cloud infrastructure 302 via the network 306, such as the DNN service 308. Client devices 304 can be any suitable type of computing device, such as personal computers, desktop computers, laptop computers, smart phones, tablets, gaming consoles, smart televisions and the like. Client devices 304 include one or more client (software) applications 316 that are configured to interact with services made available by cloud infrastructure 302. In so embodiments, client applications 316 include dedicated applications installed on the client device and programmed to interact with one or more services provided by cloud infrastructure. In other embodiments, client applications 316 include general purpose applications, such as a web browser, configured to access services over the network 306.

Figure 4:
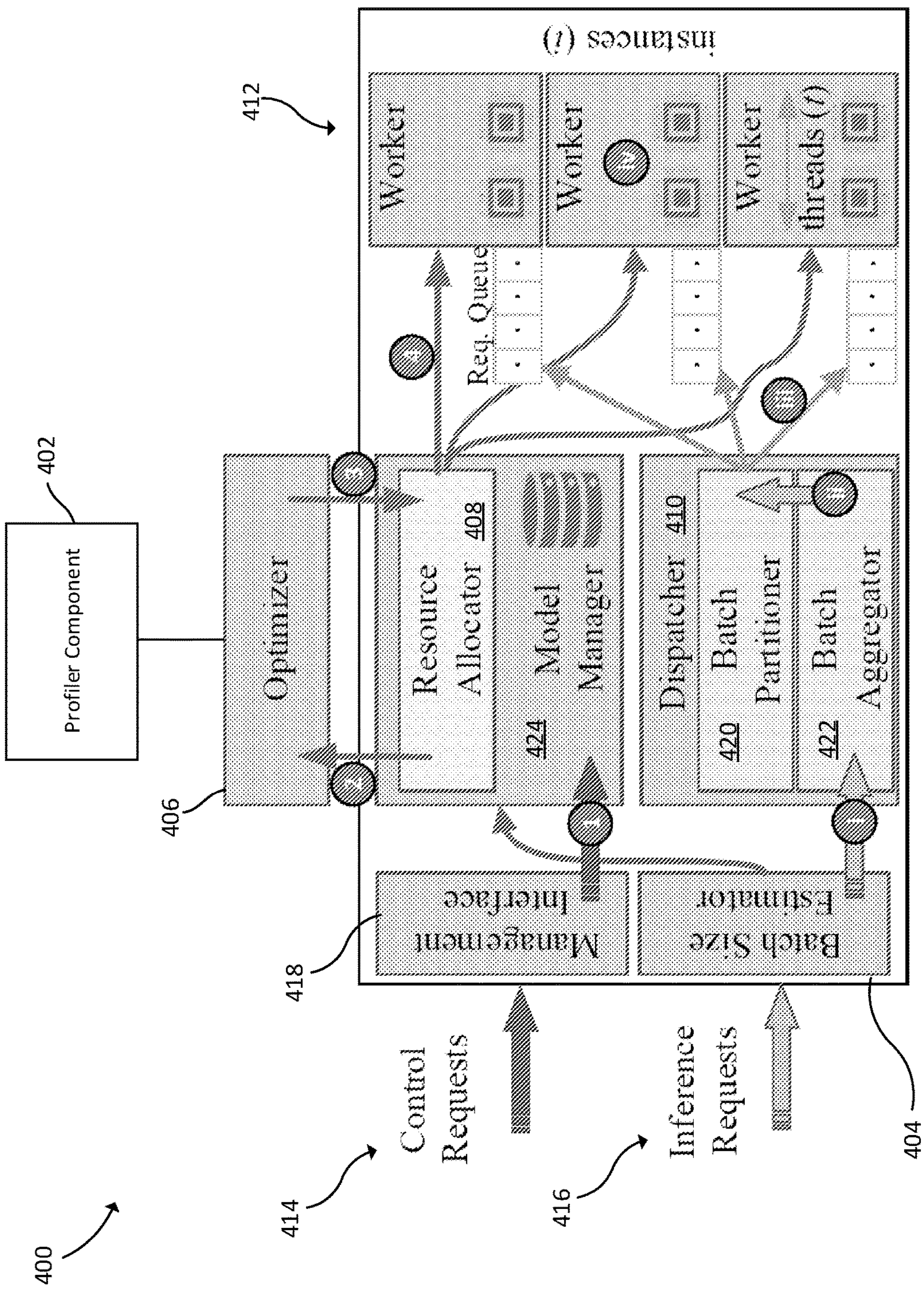
FIG. 4 shows an example implementation of a thread optimization system that may be implemented in the computing environment of FIG. 1.

In accordance with the disclosure, cloud infrastructure includes a thread optimization system 318 for optimization the allocation of threads and model instances for the DNN service 108. An example implementation of a thread optimization system 400 is shown in FIG. 4. The system 400 includes a profiler component 402, a batch-size estimator 404 component, an optimizer component 406, a resource allocator component 408, a dispatcher component 410, a model manager component 424, and worker instances 412. The batch-size estimator component 404 estimates the batch size for inference requests that is currently being used by the model serving system. The batch size is a configuration parameter for the model serving system that is used to set various operating characteristics of the model serving system. The model serving system sets a batch size for the system based on a number of factors, such as rates that inference requests are received, queue size for inference requests, number of requests in the queue, forecasted rates/patterns of requests, and the like. If the estimator component 404 decides that the system needs to be reconfigured to serve a batch size B in steady state, the batch size B together with the number of cores (T) is fed to the optimizer component 406 to find the optimal ⟨i, t, b⟩ configuration for serving. The optimizer 406 uses profiled data to find this optimal configuration. The resource allocator component 408 allocates resources to the instances based on the configuration found by the optimizer. Once the resources are allocated and all instances of the new optimal ⟨i, t, b⟩ configuration are created, the dispatcher 410 forwards inputs to each instance 412 as appropriate. Each worker instance 412 executes the inference given to it by the dispatcher 410 and then returns results.

Figure 5:
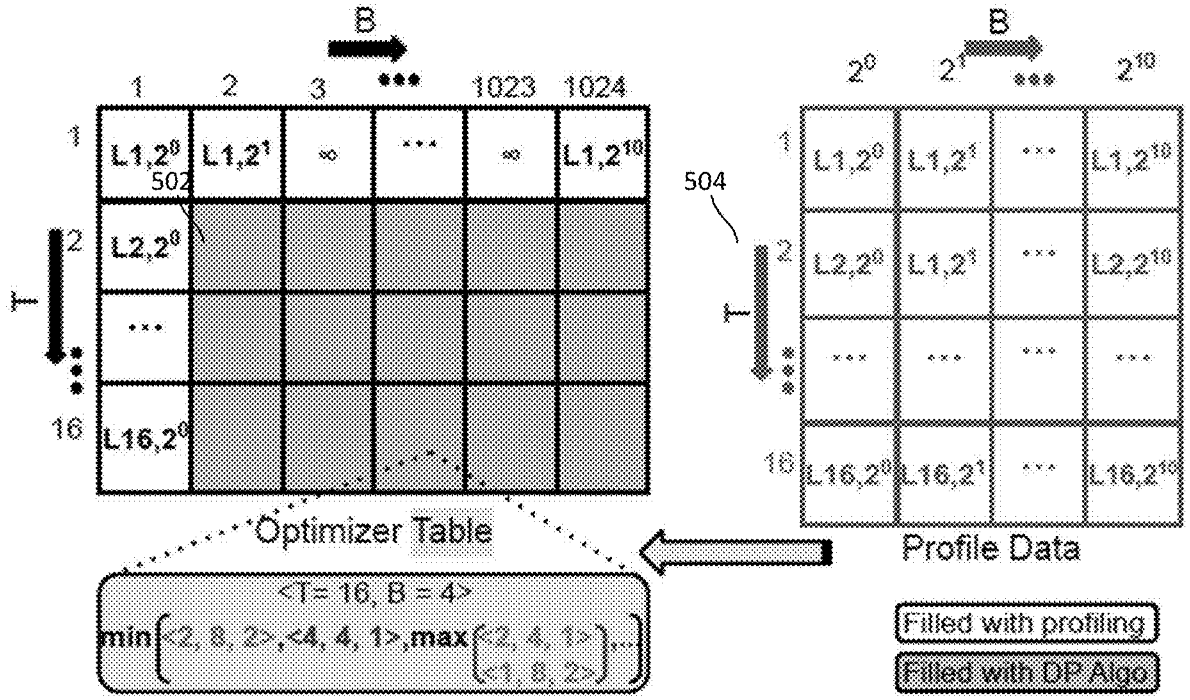
FIG. 5 shows an example implementation of profile lookup table and optimization table for the thread optimization system of FIG. 4.

The thread optimization system 400 uses model profiles to find ⟨i, t, b⟩ configurations that will improve performance for a given ⟨T, B⟩. Model profiling is always done using a single instance at a time, while varying threads for intra-operator parallelism (t) and batch size (b). The profiler component runs configurations for various ⟨t, b⟩ values. In practice, the formula $\langle t, b\rangle \in \{1, \ldots, T\}\times\{2^0, 2^1, \ldots, 2^n\}$ enumerates the configurations. For each of these configurations, the profiler component 402 records its average batch latency $L_{t,b}$. By using only powers of 2 for b, the profiler component 402 reduces the number of profiled configurations from $2^n \cdot T$ to $(n+1)\cdot T$. While profiling more configurations could lead to more accurate performance estimates (and thus improve the optimizer's final choice of configurations), this amount of profiling is sufficient to show substantial gains. Moreover, profiling each configuration takes on the order of minutes, making profiling such a combinatorial space impractical for realistic workloads. For example, for n=10 and T=16, using only powers of 2 for b reduces the number of profiled configurations from 16,384 to 176 which reduces wall-clock profiling time from 30 days to a few hours. In implementations, the profiler component 402 stores the profile data in memory in a suitable data structure, such as a lookup table 504, as depicted in FIG. 5. As FIG. 5 shows, the optimizer component queries the profiled lookup table 504 to find the expected latency for a given configuration and saves this information in an optimizer table 502 (e.g., Profile[t, b]). For each profiled configuration ⟨1, t, b⟩, Profile[t,b]502 contains the measured single-instance average batch latency (represented as $L_{t,b}$), which the optimizer component 406 uses to find configurations to minimize end-to-end latency. The profiler component 402 may perform separate profiling to let the system choose between options like "eager" versus "graph" mode. In implementations, the system may be configured to receive user input defining whichever configuration options the user plans to run the model with. Profiling is performed offline, and it is not on the inference critical path.

The optimizer component 406 is the core algorithmic component of the thread optimization system 400. Its goal is to find an ⟨i, t, b⟩ configuration that minimizes average batch latency for a given ⟨T, B⟩. Optimal configurations for a given ⟨T, B⟩ are cached to avoid repeated work. The profiler component uses dynamic programming to find the expected optimal configuration for a given ⟨T, B⟩, using the latency of the profiled configurations as an input. To accomplish this, a multidimensional knapsack problem formulation is utilized. The size of the knapsack is 2-dimensional. The first dimension is the number of cores (T) and the second dimension is the batch size (B). Profiled configurations are used as the items to fill the knapsack. The weight of each item is ⟨t, b⟩, and the value of the item is the expected average batch latency of the ⟨t, b⟩ configuration. A given ⟨t, b⟩ configuration can be used multiple times (corresponds to the same ⟨t, b⟩ configuration executing concurrently). The goal of the optimizer 406 is to find a set of items that minimizes average batch latency (Equation 1) across model instances while keeping the total weight of the items equal to the size of the knapsack ⟨T, B⟩ (Equation 2).

$$\text{Minimize} \max_{\substack{0 \le t_j \le T \\ 0 \le b_j \le B}} L_{t_j, b_j} \tag{1}$$

-continued $$\text{subject to } \sum t_j = T \text{ and } \sum b_j = B \quad (2)$$

$L_{t_j,b_j}$ is the latency of the $\langle t_j, b_j \rangle$ configuration. $t_j$, $b_j$ are the number of cores and batch size of the jth configuration.

The dynamic programming algorithm will now be described. Let opt[t, b] be the total latency of processing b inputs with the t threads. opt[t, b] has the optimal sub-problem property, i.e., opt[t, b] can be computed by looking at opt[t', b'] where t'≤t and b'≤b. If possible, opt[t, b] is initialized to the profiled latency with the same number of inputs and threads. Otherwise, it is initialized to ∞. Mathematically, opt[t, b] can be computed as follows:

$$\mathrm{opt}[t, b] = \min\Big(\max_{t' \le t, b' \le b}\big(\mathrm{opt}[t - t', b - b'], L_{t',b'}\big)\Big)$$

where $L_{t',b'}$ is the latency of the profiled configuration (t', b'). The inner max is performed since the end-to-end latency of two concurrent work items is just the latency of the slower work item. The returned configuration is the configuration corresponding to opt[T, B]. This algorithm has a runtime complexity pseudo-polynomial in T and B, which is practical for reasonable T and B values.

The above algorithm provides the optimal solution in theory since it searches over all possible configurations. However, in practice, the generated ⟨T, B⟩ solution might not match the expected theoretical optimal, since the optimizer 406 depends on profiles measured in isolation, and it disregards performance contention from running various ⟨i, t, b⟩ configurations concurrently on the same multicore server (such contention profilig across all configuration combinations is impractical). However, the gap between the optimal solution in theory and practice is small.

The resource allocator component 408 assigns resources to instances based on the ⟨i, t, b⟩ configuration returned by the optimizer component 406. The resource allocator component 408 is the only component that interacts with the dispatcher component 410 and the worker instances 412. The resource allocator component 408 assumes that resources are not over-subscribed and $\Sigma i_j \cdot t_j$ is less than or equal to the number of physical cores in the system. Given that the resources are not over-subscribed, the resource allocator component 408 can allocate resources to the instances 412 in a round robin fashion. The compute resources for each instance are statically allocated at the time of instance creation and do not change at runtime. Hence, the resource allocator component 408 pins the instance to the cores allocated to it to avoid thread migration costs.

The resource allocator component 408 is independent of the optimizer component 406 and a user can specify other ways to allocate resources to the instances. For example, the user can specify specific cores or sockets for each instance. By default, the resource allocator component 408 avoids assigning cores across sockets to any single instance. This is done to avoid performance degradation due to inter-socket communication overheads across NUMA domains. However, while individual instances are socket-local, different instances can utilize all available sockets in the system. In implementations, the resource allocator component 408 may be configured to receive user input specifying cores and/or sockets for each instance, as mentioned above.

The dispatcher component 410 handles two types of requests: (1) management/control requests 414 and (2) inference requests 416. The dispatcher's management interface 418 handles "control" messages 414 such as requests to register a new model and those to create and delete instances of any of the registered models. Management requests 414 are handled by the dispatcher 410 itself and are not on the critical path of inference execution. Model manager component 424 manages the storage of models and loads/picks the models which have been requested to be served. The model manager component 424 may also allocate machines to models and maintain mappings of machines to models.

Inference requests 416 are dispatched to appropriate worker instances 412. The dispatcher component 410 handles both batch aggregation 420 and batch partitioning 422 of the requests. Batch aggregation (B) is done per model and batch partitioning is done per instance using the b values in the ⟨i, t, b⟩ configuration. Batch aggregation 420 also uses a user-provided batch timeout value, and request aggregation is done until the timeout expires. If the timeout expires before the batch size B is reached, the dispatcher component 410 simply dispatches the current batch to the instances. The batch size estimator 404 component triggers a configuration change if batch timeouts happen too frequently. However, instance reconfiguration is time consuming and is done conservatively.

Each worker instance 412 is responsible for executing an inference batch with b inputs for a given model using t threads. Each worker instance 412 executes a user-provided handler over a batch of requests. A handler takes the batch of requests as input and returns the batch of responses. During the handler initialization, a worker instance 412 might need to load the model into the memory. Users may also specify any optimizations to use during model initialization. For example, the user can specify that the model should be loaded and optimized for graph mode (e.g., TorchScript for PyTorch framework). Each handler mainly consists of three parts: (1) Pre-processing, (2) Inference and (3) Post-processing. Pre-processing and post-processing are user provided functions which are executed before and after inference. Inference is executed by the framework (e.g., PyTorch). Pre-processing usually involves data transformations. For example, pre-processing for an image classification model can involve decoding the image, resizing it to a fixed size, and transforming it into the right format for the model (e.g., a PyTorch tensor). Post-processing usually converts the output of the inference into user-understandable format. For example, for a computer vision model, post-processing can be the conversion of the output tensor to a list of labels.

Inference is executed by the framework using parallel implementations of the operators (intra-op parallelism). Each parallel operator implementation is responsible for executing the operator across tintra-operator threads. This parallelization involves slicing the input batch into multiple chunks, partitioning operator state across threads, and executing the operator on each chunk in parallel. The thread optimization system does not improve the mechanism of operator parallelization but simply uses the functionality provided by the framework in a more efficient way by assigning an appropriate number of threads.

Reconfiguration is the process of changing the ⟨i, t, b⟩ configuration for a model and is handled by the resource allocator component 408. The batch-size estimator 404 receives inference requests 416 and triggers a configuration change by invoking the optimizer with a new batch size B"

if it predicts that the request arrival rate for a given model has changed considerably. Reconfiguration does not generally require the profiler component 402 and/or optimizer component 406 to run any new profiling. As the batch size changes, the optimizer 406 is re-run with the new B" value to find the right configuration for the new batch size (if the given ⟨T, B⟩ configuration is not present in the optimizer cache).

Reconfiguration is time consuming and done conservatively, i.e., the configuration change is only initiated if batch aggregation timeouts are being triggered frequently or if request queuing delays are large, and this is ongoing for an extended time period. The thread optimization system works with an implicit assumption that the workload for a given model does not change frequently, which is a reasonable assumption for many datacenter workloads. Moreover, dramatic workload changes would not only affect system configuration but could also require datacenter-level resource reprovisioning.

The thread optimization system uses a TorchServe feature, worker scaling, to handle configuration changes. Worker scaling is the process of increasing or decreasing the number of workers for a given model. However, in the thread optimization system, the configuration of the model instance itself may have to be changed, as dictated by the optimizer, by allocating it fewer or more threads than currently assigned.

Implementations of the thread optimization system may handle configuration changes in two different ways. The first is when a configuration change only requires increasing or decreasing the number of instances, but the number of threads within each of the existing instances 412 remains the same. Such configuration changes are handled by the worker scaling mechanism. Scaling down is achieved by removing the workers 412 of a model one by one. Workers 412 are removed in a round robin fashion and resources are released back to the resource allocator 408. Scaling up is similar to the initial worker creation process.

The second is the trickier case, and it occurs when the configuration change requires different numbers of threads for the workers as compared to their current configuration. The system handles such reconfigurations in a two-step process called active-passive scaling. The system relies on this two-step process to avoid changing the internal operator implementation libraries which makes the system portable across serving systems. Operator implementation libraries, such as ATen, MKL-DNN, etc., have their own internal mechanisms to manage and schedule the threads, but these libraries are not designed to handle frequent configuration changes. For example, PyTorch allows changing the number of MKL threads for each instance when the library is used with MKL_DYNAMIC=true; however, to implement this MKL creates and destroys threads for each matrix multiplication, resulting in lower performance due to the high cost of creating threads. Hence, PyTorch uses internal MKL libraries with MKL_DYNAMIC=false.

The system uses active-passive scaling when the optimizer component 406 suggested configuration change requires instances to adjust the number of allocated threads. A naive way of going about such a reconfiguration would be to first shut down all instances in the old configuration (e.g., ⟨$i_1$, $t_1$, $b_1$⟩) and then start all instances in the new configuration (e.g., ⟨$i_2$, $t_2$, $b_2$⟩). In the worst case, all the old workers will be removed, and new workers will be created. However, such an approach risks having the serving system be unresponsive for the entire duration of such time-consuming reconfigurations.

Figure 6:
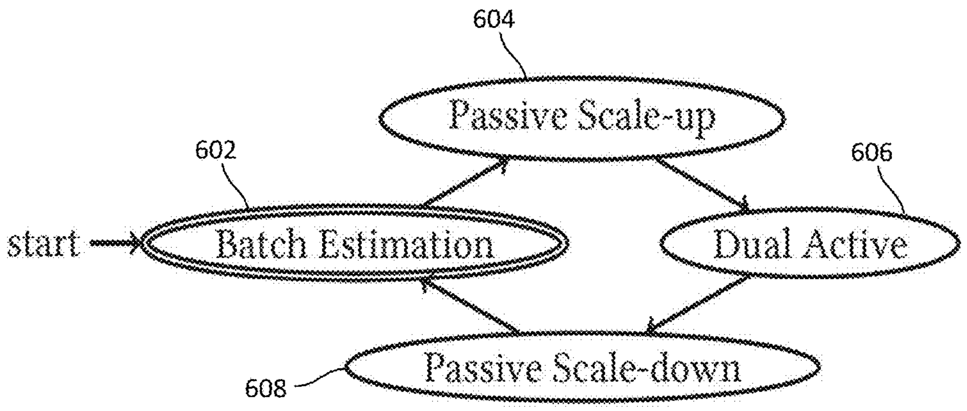
FIG. 6 is a state transition diagram of an active-passive scaling process implemented by the thread optimization system of FIG. 4.

The thread optimization system uses active-passive scaling to avoid disruption. For each model, the system maintains two versions of the model. The active version respects the current configuration and is currently serving requests. The passive version has zero workers and stays inactive until activated. Active-passive scaling is done in three steps, as shown in FIG. 6. First, after the batch size has been estimated (e.g., batch estimation 602) the passive version is scaled up (e.g., passive scale-up 604) to the new configuration (e.g., scale up to $i_2$ workers as per the new ⟨$i_2$, $t_2$, $b_2$⟩ configuration). Next, the dispatcher component 410 starts redirecting new requests to the new passive instances which results in the newly active version and the historically active version being temporarily active at the same time (e.g., dual active 606). Finally, the historically active version is scaled down to zero workers (e.g., passive scale-down 608) in the background (from $i_1$ workers as per the old ⟨$i_1$, $t_1$, $b_1$⟩ configuration) once they have completed their ongoing requests and been deactivated at the dispatcher 410. At this point, the active and passive sets of workers have been swapped.

To choose a good configuration, the system needs to know the batch size for the current workload (B). The batch-size estimator 404 estimates the batch size in an online fashion by tracking the request queue depth over time. It is easy enough for the batch aggregator 422 to track the size of each batch that it passes to workers, but this batch size varies over time depending on input request arrivals, and different batch sizes have different "optimal" ⟨i, t, b⟩ configurations.

Reconfiguring the number of instances and threads takes several seconds and is computationally expensive, so it is important that reconfiguration only happens when the workload is stable enough to warrant it. Without some kind smoothing, the system will risk "flip-flopping" between configurations. Two-level smoothing is used to avoid this problem. First, the batch-size estimator uses the most recent request queue depth Q to track an exponentially weighted moving average of request queue depth ($Q_x=\alpha Q+(1-\alpha)Q_{x-1}$) and picks the next lower power of two to Q as an estimated batch size $B_x$. Second, the batch-size estimator takes the mode over the last n estimated batch sizes ($B''_{x-n}, \ldots, B''_x$) to get a final smoothed batch size (B"). After each reconfiguration timeout, the batch-size estimator compares the current batch size B" to the smoothed batch size B". If B" is different from B the system reconfigures itself to use the new batch size B".

In practice, the thread optimization system may be implemented as an extension of a DNN serving system, such as TorchServe which is a serving system in the PyTorch ecosystem. A serving system, such as TorchServe, provides the base serving system and typically has features for model management, adaptive batching, a management API for worker creation and deletion, and Application Programming Interfaces (APIs) for accessing these features. The thread optimization system provides features, such as the batch size estimator, batch aggregator, optimizer, and resource allocator. The optimizer is responsible for providing the optimal configuration for a given ⟨T, B⟩ pair. However, the optimizer does not directly interact with the resource allocator. As a result, the optimizer may be implemented as a standalone service. A separate task may act as a client to the optimizer which communicates with the resource allocator (which may be integrated into the base serving system), e.g., using an API. The resource allocator then updates the configuration to match the desired configuration returned by the optimizer. The thread optimization system integrates additional batch processing features into the service, such as batch aggregation and a batch size estimator that intercepts incoming requests and estimates the batch size for each inference endpoint.

Figure 7:
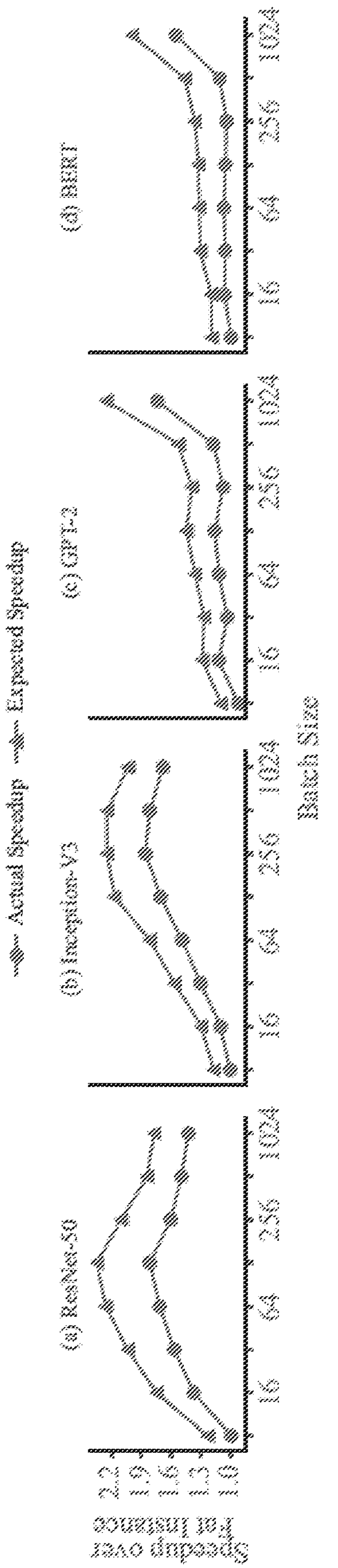
FIG. 7 shows graphs of the actual speedup and expected speedup realized by the thread optimization system with different models.

FIG. 7 shows the throughput and latency speedup of multi-instance execution over fat instances for ResNet-50 (a), Inception-v3 (b), GPT-2 (c), and BERT (d) models. The speedup is measured for different batch sizes and for all threads in a socket. The fat instance is run with 16 threads and batch size B and the thin instances use the ⟨i, t, b⟩ configuration suggested by the thread optimization system where ⟨T, B⟩ is partitioned across $\Sigma i_j$ smaller instances where $\Sigma i_j \cdot t_j = T$ and $\Sigma i_j \cdot b_j = B$. For a given ⟨T, B⟩, the average throughput and latency of the system's chosen configuration ($\tau_P$ and $\lambda_P$) and the fat-instance baseline ($\tau_B$ and $\lambda_B$) was measured. Throughput and latency improvements were calculated as $\tau_P/\tau_B$ and $\lambda_B/\lambda_P$, respectively. Even though the configurations chosen by the thread optimization system used the same total number of threads as the fat instance, the thread optimization system obtained substantial improvements in latency and throughput. The image classifiers, ResNet50 and Inception-V3 show a 1.53× and 1.52× mean speedup across batch sizes, respectively. The language models GPT-2 and BERT show a 1.18× and 1.13× average speedup, respectively.

There are two key reasons that the configurations generated by thread optimization system outperformed the fat instance which uses all threads on the server for intra-operator parallelism. First, all OpenMP threads synchronize at multiple barriers in the fat-instance execution resulting in compute resource under-utilization. However, in multi-instance execution, thread(s) in each instance can execute independently of other instances. This allows the multi-instance execution to utilize the available compute resources more efficiently.

Second, usually, workloads have multiple phases with different characteristics (e.g., a part that is compute-intensive and another that is memory-intensive). OpenMP barrier sync enforces all the threads to march in lock-step, forcing every thread to execute similar work. This results in over-utilization of one resource and under-utilization of other resources. However, the thread optimization system's configurations include some degree of multi-instance execution. Hence, the threads in each instance can execute different phases without coordination. This results in better average compute and memory bandwidth utilization, which is also apparent when profiling the execution of both approaches.

Figure 8:
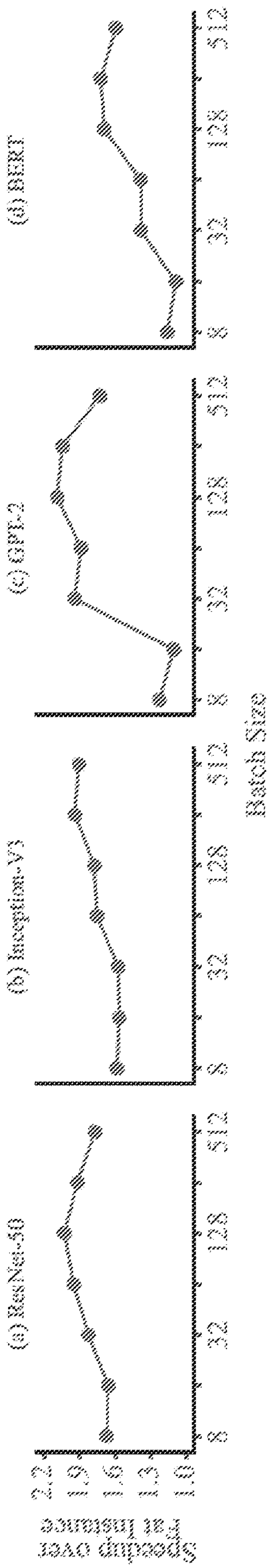
FIG. 8 is a flowchart of an example method of optimizing allocation of threads for a model serving system.

FIG. 8 shows the latency and throughput speedup of the thread optimization system's chosen configurations over baseline fat-instance execution for ResNet-50 (a), Inception-v3 (b), GPT-2 (c), and BERT (d). The system consistently improved performance across all batch sizes for all models. The optimization system provides an average speedup of 1.43× to 1.83× and a maximum speedup of 1.72× to 2.09×.

Figure 9:
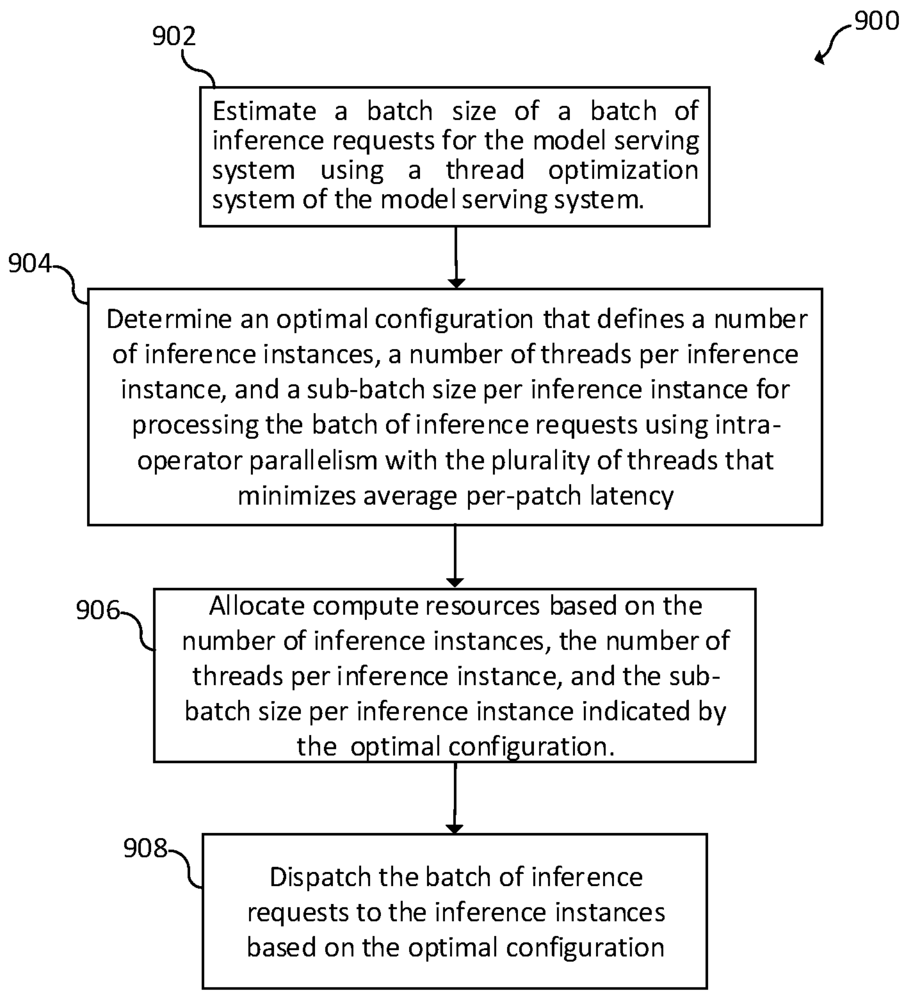
FIG. 9 is a block diagram illustrating an example software architecture, various portions of which may be used in conjunction with various hardware architectures herein described.

FIG. 9 is a flowchart of an example method 900 of optimizing thread allocation for a model (e.g., DNN) serving system. The method begins with estimating a batch size of a batch of inference requests for the model serving system (block 902). The model serving system serves a deep learning model and includes a plurality of threads corresponding to a total thread count for processing inferences for the deep learning model. An optimizer component of a thread optimizer system for the model serving system then determines an optimal configuration that defines a number of inference instances, a number of threads per inference instance, and a sub-batch size per inference instance for processing the batch of inference requests using intra-operator parallelism with the plurality of threads that minimizes average per-batch latency (block 904). The optimal configuration is determined with reference to a plurality of predetermined model profiles that define single-inference average batch latencies for different combinations of thread counts and batch sizes. The predetermined model profiles are used as input to a dynamic programming algorithm that identifies optimal configurations that minimize the average per-batch latency. Once the optimal configuration is determined, compute resources are allocated based on the number of inference instances, the number of threads per inference instance, and the sub-batch size per inference instance indicated by the optimal configuration (block 906). The batch of inference requests is then dispatched to the inference instances in accordance with the optimal configuration (block 908).

Figure 10:
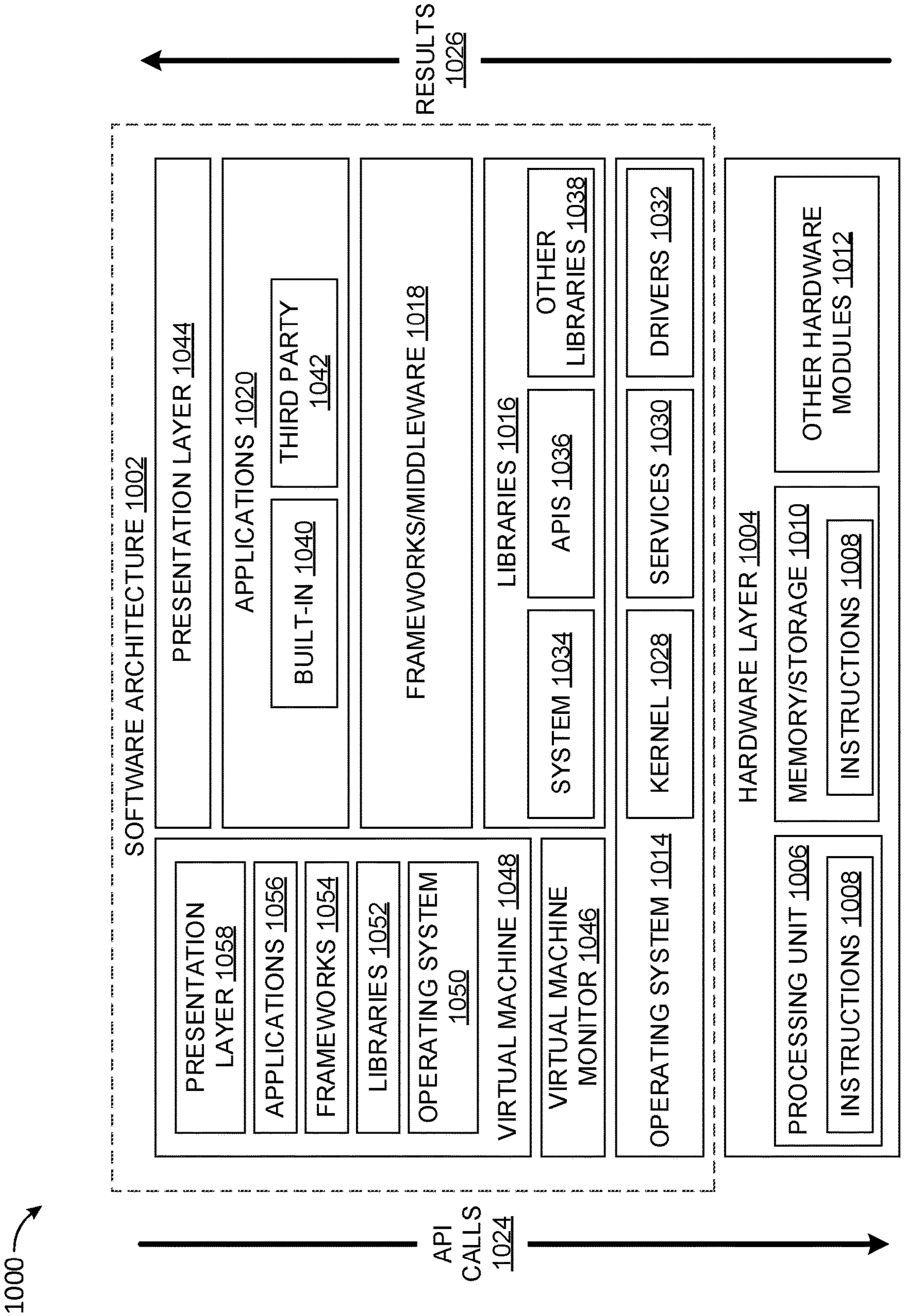
FIG. 10 is a block diagram illustrating components of an example machine configured to read instructions from a machine-readable medium and perform any of the features described herein.

FIG. 10 is a block diagram 1000 illustrating an example software architecture 1002, various portions of which may be used in conjunction with various hardware architectures herein described, which may implement any of the above-described features. FIG. 10 is a non-limiting example of a software architecture, and it will be appreciated that many other architectures may be implemented to facilitate the functionality described herein. The software architecture 1002 may execute on hardware such as a machine 1100 of FIG. 11 that includes, among other things, processors 1110, memory 1130, and input/output (I/O) components 1150. A representative hardware layer 1004 is illustrated and can represent, for example, the machine 1100 of FIG. 11. The representative hardware layer 1004 includes a processing unit 1006 and associated executable instructions 1008. The executable instructions 1008 represent executable instructions of the software architecture 1002, including implementation of the methods, modules and so forth described herein. The hardware layer 1004 also includes a memory/storage 1010, which also includes the executable instructions 1008 and accompanying data. The hardware layer 1004 may also include other hardware modules 1012. Instructions 1008 held by processing unit 1006 may be portions of instructions 1008 held by the memory/storage 1010.

The example software architecture 1002 may be conceptualized as layers, each providing various functionality. For example, the software architecture 1002 may include layers and components such as an operating system (OS) 1014, libraries 1016, frameworks 1018, applications 1020, and a presentation layer 1044. Operationally, the applications 1020 and/or other components within the layers may invoke API calls 1024 to other layers and receive corresponding results 1026. The layers illustrated are representative in nature and other software architectures may include additional or different layers. For example, some mobile or special purpose operating systems may not provide the frameworks/middleware 1018.

The OS 1014 may manage hardware resources and provide common services. The OS 1014 may include, for example, a kernel 1028, services 1030, and drivers 1032. The kernel 1028 may act as an abstraction layer between the hardware layer 1004 and other software layers. For example, the kernel 1028 may be responsible for memory management, processor management (for example, scheduling), component management, networking, security settings, and so on. The services 1030 may provide other common services for the other software layers. The drivers 1032 may be responsible for controlling or interfacing with the underlying hardware layer 1004. For instance, the drivers 1032 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1016 may provide a common infrastructure that may be used by the applications 1020 and/or other components and/or layers. The libraries 1016 typically provide functionality for use by other software modules to perform tasks, rather than rather than interacting directly with the OS 1014. The libraries 1016 may include system libraries 1034 (for example, C standard library) that may provide functions such as memory allocation, string manipulation, file operations. In addition, the libraries 1016 may include API libraries 1036 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1016 may also include a wide variety of other libraries 1038 to provide many functions for applications 1020 and other software modules.

The frameworks 1018 (also sometimes referred to as middleware) provide a higher-level common infrastructure that may be used by the applications 1020 and/or other software modules. For example, the frameworks 1018 may provide various graphic user interface (GUI) functions, high-level resource management, or high-level location services. The frameworks 1018 may provide a broad spectrum of other APIs for applications 1020 and/or other software modules.

The applications 1020 include built-in applications 1040 and/or third-party applications 1042. Examples of built-in applications 1040 may include, but are not limited to, a contacts application, a browser application, a location application, a media application, a messaging application, and/or a game application. Third-party applications 1042 may include any applications developed by an entity other than the vendor of the particular platform. The applications 1020 may use functions available via OS 1014, libraries 1016, frameworks 1018, and presentation layer 1044 to create user interfaces to interact with users.

Some software architectures use virtual machines, as illustrated by a virtual machine 1048. The virtual machine 1048 provides an execution environment where applications/modules can execute as if they were executing on a hardware machine (such as the machine 1100 of FIG. 11, for example). The virtual machine 1048 may be hosted by a host OS (for example, OS 1014) or hypervisor, and may have a virtual machine monitor 1046 which manages operation of the virtual machine 1048 and interoperation with the host operating system. A software architecture, which may be different from software architecture 1002 outside of the virtual machine, executes within the virtual machine 1048 such as an OS 1050, libraries 1052, frameworks 1054, applications 1056, and/or a presentation layer 1058.

Figure 11:
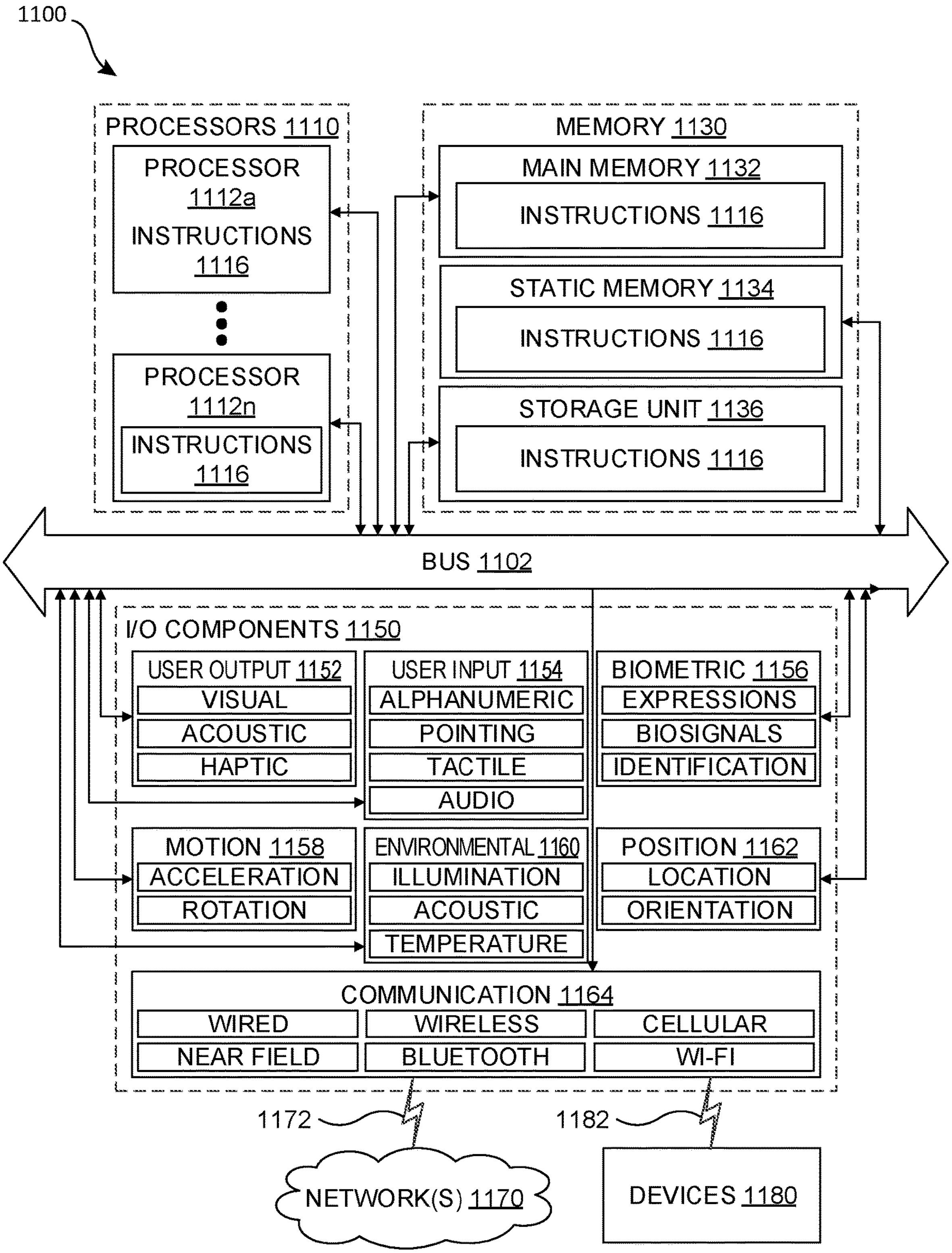
FIG. 11 is a block diagram illustrating components of an example machine configured to read instructions from a machine-readable medium.

FIG. 11 is a block diagram illustrating components of an example machine 1100 configured to read instructions from a machine-readable medium (for example, a machine-readable storage medium) and perform any of the features described herein. The example machine 1100 is in a form of a computer system, within which instructions 1116 (for example, in the form of software components) for causing the machine 1100 to perform any of the features described herein may be executed. As such, the instructions 1116 may be used to implement modules or components described herein. The instructions 1116 cause unprogrammed and/or unconfigured machine 1100 to operate as a particular machine configured to carry out the described features. The machine 1100 may be configured to operate as a standalone device or may be coupled (for example, networked) to other machines. In a networked deployment, the machine 1100 may operate in the capacity of a server machine or a client machine in a server-client network environment, or as a node in a peer-to-peer or distributed network environment. Machine 1100 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1100 is illustrated, the term "machine" includes a collection of machines that individually or jointly execute the instructions 1116.

The machine 1100 may include processors 1110, memory 1130, and I/O components 1150, which may be communicatively coupled via, for example, a bus 1102. The bus 1102 may include multiple buses coupling various elements of machine 1100 via various bus technologies and protocols. In an example, the processors 1110 (including, for example, a central processing unit (CPU), a graphics processing unit (GPU), a digital signal processor (DSP), an ASIC, or a suitable combination thereof) may include one or more processors 1112*a* to 1112*n* that may execute the instructions 1116 and process data. In some examples, one or more processors 1110 may execute instructions provided or identified by one or more other processors 1110. The term "processor" includes a multi-core processor including cores that may execute instructions contemporaneously. Although FIG. 11 shows multiple processors, the machine 1100 may include a single processor with a single core, a single processor with multiple cores (for example, a multi-core processor), multiple processors each with a single core, multiple processors each with multiple cores, or any combination thereof. In some examples, the machine 1100 may include multiple processors distributed among multiple machines.

The memory/storage 1130 may include a main memory 1132, a static memory 1134, or other memory, and a storage unit 1136, both accessible to the processors 1110 such as via the bus 1102. The storage unit 1136 and memory 1132, 1134 store instructions 1116 embodying any one or more of the functions described herein. The memory/storage 1130 may also store temporary, intermediate, and/or long-term data for processors 1110. The instructions 1116 may also reside, completely or partially, within the memory 1132, 1134, within the storage unit 1136, within at least one of the processors 1110 (for example, within a command buffer or cache memory), within memory at least one of I/O components 1150, or any suitable combination thereof, during execution thereof. Accordingly, the memory 1132, 1134, the storage unit 1136, memory in processors 1110, and memory in I/O components 1150 are examples of machine-readable media.

As used herein, "machine-readable medium" refers to a device able to temporarily or permanently store instructions and data that cause machine 1100 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term “machine-readable medium” applies to a single medium, or combination of multiple media, used to store instructions (for example, instructions 1116) for execution by a machine 1100 such that the instructions, when executed by one or more processors 1110 of the machine 1100, cause the machine 1100 to perform and one or more of the features described herein. Accordingly, a “machine-readable medium” may refer to a single storage device, as well as “cloud-based” storage systems or storage networks that include multiple storage apparatus or devices. The term “machine-readable medium” excludes signals per se.

The I/O components 1150 may include a wide variety of hardware components adapted to receive input, provide output, produce output, transmit information, exchange information, capture measurements, and so on. The specific I/O components 1150 included in a particular machine will depend on the type and/or function of the machine. For example, mobile devices such as mobile phones may include a touch input device, whereas a headless server or IoT device may not include such a touch input device. The particular examples of I/O components illustrated in FIG. 11 are in no way limiting, and other types of components may be included in machine 1100. The grouping of I/O components 1150 are merely for simplifying this discussion, and the grouping is in no way limiting. In various examples, the I/O components 1150 may include user output components 1152 and user input components 1154. User output components 1152 may include, for example, display components for displaying information (for example, a liquid crystal display (LCD) or a projector), acoustic components (for example, speakers), haptic components (for example, a vibratory motor or force-feedback device), and/or other signal generators. User input components 1154 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1150 may include biometric components 1156, motion components 1158, environmental components 1160, and/or position components 1162, among a wide array of other physical sensor components. The biometric components 1156 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 1158 may include, for example, acceleration sensors (for example, an accelerometer) and rotation sensors (for example, a gyroscope). The environmental components 1160 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 1162 may include, for example, location sensors (for example, a Global Position System (GPS) receiver), altitude sensors (for example, an air pressure sensor from which altitude may be derived), and/or orientation sensors (for example, magnetometers).

The I/O components 1150 may include communication components 1164, implementing a wide variety of technologies operable to couple the machine 1100 to network(s) 1170 and/or device(s) 1180 via respective communicative couplings 1172 and 1182. The communication components 1164 may include one or more network interface components or other suitable devices to interface with the network(s) 1170. The communication components 1164 may include, for example, components adapted to provide wired communication, wireless communication, cellular communication, Near Field Communication (NFC), Bluetooth communication, Wi-Fi, and/or communication via other modalities. The device(s) 1180 may include other machines or various peripheral devices (for example, coupled via USB).

In some examples, the communication components 1164 may detect identifiers or include components adapted to detect identifiers. For example, the communication components 1164 may include Radio Frequency Identification (RFID) tag readers, NFC detectors, optical sensors (for example, one- or multi-dimensional bar codes, or other optical codes), and/or acoustic detectors (for example, microphones to identify tagged audio signals).

In the following, further features, characteristics and advantages of the invention will be described by means of items:

Item 1. A thread optimization system for a model serving system, the thread optimization system comprising:

a processor; and a memory in communication with the processor, the memory comprising executable instructions that, when executed by the processor alone or in combination with other processors, cause the thread optimization system to perform functions of:

estimating a batch size for inference requests of the model serving system, the model serving system serving a deep learning model and including a plurality of threads corresponding to a total thread count for processing inferences for the deep learning model;

automatically determining, using an optimizer component of the thread optimizer system, a first optimal configuration that defines a number of inference instances, a number of threads per inference instance, and a sub-batch size per inference instance for processing a batch of inference requests of the batch size using intra-operator parallelism with the plurality of threads that minimizes average per-patch latency, the first optimal configuration being determined with reference to a plurality of predetermined model profiles that define single-inference average batch latencies for different combinations of thread counts and batch sizes, the predetermined model profiles being used as input to a dynamic programming algorithm that identifies optimal configurations that minimize the average per-batch latency; and allocating compute resources based on the number of inference instances, the number of threads per inference instance, and the sub-batch size per inference instance indicated by the first optimal configuration.

Item 2. The thread optimization system of item 1, wherein the dynamic programming algorithm is a 2-dimensional knapsack problem with a first dimension corresponding to a number of cores available for processing inference requests for the model serving system and a second dimension corresponding to the batch size, wherein the predetermined model profiles correspond to fill items for the knapsack problem and weights of the fill items correspond to thread counts and batch sizes associated with respective predetermined model profiles, and wherein a goal of the knapsack problem is to find a set of fill items that minimizes the average batch latency across model instances while keeping a total weight of the fill items to a size of the knapsack.

Item 3. The thread optimization system of any of items 1-2, wherein the functions further comprise:

dispatching inference requests to the inference instances based on the optimal configuration using a dispatching component of the thread optimizing system.

Item 4. The thread optimization system of any of items 1-3, wherein the functions further comprise:

triggering a configuration change when a different batch size for inference requests is detected, the configuration change including:

automatically determining, using the optimizer component of the thread optimizer system, a second optimal configuration that defines a number of inference instances, a number of threads per inference instance, and a sub-batch size per inference instance for processing a batch of inference requests of the different batch size using intra-operator parallelism; and allocating the compute resources based on the number of inference instances, the number of threads per inference instance, and the sub-batch size per inference instance indicated by the second optimal configuration.

Item 5. The thread optimization system of any of items 1-4, wherein the second optimal configuration indicates a change in the number of threads per inference instance, and wherein the functions further comprise:

activating a first set of inference instances as active instances for the first optimal configuration, and activating a second set of inference instances as passive instances for the first optimal configuration;

in response to triggering the configuration change, configuring the second set of inference instances based on the second optimal configuration and swapping the second set of inference instances with the first set of inference instances such that the second set of inference instances are the active instances and the first set of inference instances are the passive instances.

Item 6. The thread optimization system of any of items 1-5, wherein the functions further comprise:

generating the predetermined model profiles using a profiler component of the thread optimization system, the predetermined model profiles being generated using only powers of 2 for the batch sizes of the predetermined model profiles.

Item 7. The thread optimization system of any of items 1-6, wherein the batch size is estimated using a batch-size estimator of the thread optimization system, the batch-size estimator being integrated into a base serving system of the model serving system and configured to intercept incoming inference requests and estimate the batch size based on the intercepted inference requests.

Item 8. A method of optimizing thread allocation for a model serving system, the method comprising:

estimating a batch size for inference requests of the model serving system using a thread optimization system of the model serving system, the model serving system serving a deep learning model and including a plurality of threads corresponding to a total thread count for processing inferences for the deep learning model;

automatically determining, using an optimizer component of the thread optimizer system, a first optimal configuration that defines a number of inference instances, a number of threads per inference instance, and a sub-batch size per inference instance for processing a batch of inference requests of the batch size using intra-operator parallelism with the plurality of threads that minimizes average per-patch latency, the first optimal configuration being determined with reference to a plurality of predetermined model profiles that define single-inference average batch latencies for different combinations of thread counts and batch sizes, the predetermined model profiles being used as input to a dynamic programming algorithm that identifies optimal configurations that minimize the average per-batch latency; and allocating compute resources based on the number of inference instances, the number of threads per inference instance, and the sub-batch size per inference instance indicated by the first optimal configuration.

Item 9. The method of item 8, wherein the dynamic programming algorithm is a 2-dimensional knapsack problem with a first dimension corresponding to a number of cores available for processing inference requests for the model serving system and a second dimension corresponding to the batch size, wherein the predetermined model profiles correspond to fill items for the knapsack problem and weights of the fill items correspond to thread counts and batch sizes associated with respective predetermined model profiles, and wherein a goal of the knapsack problem is to find a set of fill items that minimizes the average batch latency across model instances while keeping a total weight of the fill items to a size of the knapsack.

Item 10. The method of any of items 8-9, further comprising:

dispatching inference requests to the inference instances based on the optimal configuration using a dispatching component of the thread optimizing system.

Item 11. The method of any of items 8-10, further comprising:

triggering a configuration change when a different batch size for inference requests is detected, the configuration change including:

automatically determining, using the optimizer component of the thread optimizer system, a second optimal configuration that defines a number of inference instances, a number of threads per inference instance, and a sub-batch size per inference instance for processing a batch of inference requests of the different batch size using intra-operator parallelism; and allocating the compute resources based on the number of inference instances, the number of threads per inference instance, and the sub-batch size per inference instance indicated by the second optimal configuration.

Item 12. The method of any of items 8-11, wherein the second optimal configuration indicates a change in the number of threads per inference instance, and further comprising:

activating a first set of inference instances as active instances for the first optimal configuration, and activating a second set of inference instances as passive instances for the first optimal configuration; and in response to triggering the configuration change, configuring the second set of inference instances based on the second optimal configuration and swapping the second set of inference instances with the first set of inference instances such that the second set of inference instances are the active instances and the first set of inference instances are the passive instances.

Item 13. The method of any of items 8-12, further comprising:

generating the predetermined model profiles using a profiler component of the thread optimization system, the predetermined model profiles being generated using only powers of 2 for the batch sizes of the predetermined model profiles.

Item 14. The method of any of items 8-13, wherein the batch size is estimated using a batch-size estimator of the thread optimization system, the batch-size estimator being integrated into a base serving system of the model serving system and configured to intercept incoming inference requests and estimate the batch size based on the intercepted inference requests.

Item 15. A non-transitory computer readable medium on which are stored instructions that, when executed, cause a programmable device to perform functions of:

estimating a batch size for inference requests of a model serving system using a thread optimization system of the model serving system, the model serving system serving a deep learning model and including a plurality of threads corresponding to a total thread count for processing inferences for the deep learning model;

automatically determining, using an optimizer component of the thread optimizer system, a first optimal configuration that defines a number of inference instances, a number of threads per inference instance, and a sub-batch size per inference instance for processing a batch of inference requests of the batch size using intra-operator parallelism with the plurality of threads that minimizes average per-patch latency, the first optimal configuration being determined with reference to a plurality of predetermined model profiles that define single-inference average batch latencies for different combinations of thread counts and batch sizes, the predetermined model profiles being used as input to a dynamic programming algorithm that identifies optimal configurations that minimize the average per-batch latency; and allocating compute resources based on the number of inference instances, the number of threads per inference instance, and the sub-batch size per inference instance indicated by the first optimal configuration.

Item 16. The non-transitory computer readable medium of item 15, wherein the dynamic programming algorithm is a 2-dimensional knapsack problem with a first dimension corresponding to a number of cores available for processing inference requests for the model serving system and a second dimension corresponding to the batch size, wherein the predetermined model profiles correspond to fill items for the knapsack problem and weights of the fill items correspond to thread counts and batch sizes associated with respective predetermined model profiles, and wherein a goal of the knapsack problem is to find a set of fill items that minimizes the average batch latency across model instances while keeping a total weight of the fill items to a size of the knapsack.

Item 17. The non-transitory computer readable medium of any of items 15-16, further comprising:

dispatching inference requests to the inference instances based on the optimal configuration using a dispatching component of the thread optimizing system.

Item 18. The non-transitory computer readable medium of any of items 15-17, further comprising:

triggering a configuration change when a different batch size for inference requests is detected, the configuration change including:

automatically determining, using the optimizer component of the thread optimizer system, a second optimal configuration that defines a number of inference instances, a number of threads per inference instance, and a sub-batch size per inference instance for processing a batch of inference requests of the different batch size using intra-operator parallelism; and allocating the compute resources based on the number of inference instances, the number of threads per inference instance, and the sub-batch size per inference instance indicated by the second optimal configuration.

Item 19. The non-transitory computer readable medium of any of items 15-18, wherein the second optimal configuration indicates a change in the number of threads per inference instance, and further comprising:

activating a first set of inference instances as active instances for the first optimal configuration, and activating a second set of inference instances as passive instances for the first optimal configuration; and in response to triggering the configuration change, configuring the second set of inference instances based on the second optimal configuration and swapping the second set of inference instances with the first set of inference instances such that the second set of inference instances are the active instances and the first set of inference instances are the passive instances.

Item 20. The non-transitory computer readable medium of any of items 15-19, further comprising:

generating the predetermined model profiles using a profiler component of the thread optimization system, the predetermined model profiles being generated using only powers of 2 for the batch sizes of the predetermined model profiles.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A thread optimization system for a model serving system, the thread optimization system comprising:

a processor; and a memory in communication with the processor, the memory comprising executable instructions that, when executed by the processor alone or in combination with other processors, cause the thread optimization system to perform functions of:

estimating a batch size for inference requests of the model serving system using a batch size estimator component of the thread optimization system, the model serving system serving a deep learning model and including a plurality of threads corresponding to a total thread count for processing inferences for the deep learning model;

automatically determining, using an optimizer component of the thread optimization system, a first optimal configuration that defines a number of inference instances, a number of threads per inference instance, and a sub-batch size per inference instance for processing a batch of inference requests of the batch size using intra-operator parallelism with the plurality of threads that minimizes average per-batch latency, the first optimal configuration being determined with reference to a plurality of predetermined model profiles that define single-inference average batch latencies for different combinations of thread counts and batch sizes, the plurality of predetermined model profiles being used as input to a dynamic programming algorithm that identifies optimal configurations that minimize the average per-batch latency; and allocating compute resources based on the number of inference instances, the number of threads per inference instance, and the sub-batch size per inference instance indicated by the first optimal configuration.

2. The thread optimization system of claim 1, wherein the dynamic programming algorithm is a 2-dimensional knapsack problem with a first dimension corresponding to a number of cores available for processing inference requests for the model serving system and a second dimension corresponding to the batch size, wherein the plurality of predetermined model profiles correspond to fill items for the knapsack problem and weights of the fill items correspond to thread counts and batch sizes associated with respective predetermined model profiles, and wherein a goal of the knapsack problem is to find a set of fill items that minimizes the average batch latency across model instances while keeping a total weight of the fill items to a size of the knapsack.

3. The thread optimization system of claim 1, wherein the functions further comprise:

dispatching inference requests to the inference instances based on the optimal configuration using a dispatching component of the thread optimizing system.

4. The thread optimization system of claim 1, wherein the functions further comprise:

triggering a configuration change when a different batch size for the inference requests is detected, the configuration change including:

automatically determining, using the optimizer component of the thread optimization system, a second optimal configuration that defines a number of inference instances, a number of threads per inference instance, and a sub-batch size per inference instance for processing a batch of inference requests of the different batch size using intra-operator parallelism; and allocating the compute resources based on the number of inference instances, the number of threads per inference instance, and the sub-batch size per inference instance indicated by the second optimal configuration.

5. The thread optimization system of claim 4, wherein the second optimal configuration indicates a change in the number of threads per inference instance, and wherein the functions further comprise:

activating a first set of inference instances as active instances for the first optimal configuration, and activating a second set of inference instances as passive instances for the first optimal configuration;

in response to triggering the configuration change, configuring the second set of inference instances based on the second optimal configuration and swapping the second set of inference instances with the first set of inference instances such that the second set of inference instances are the active instances and the first set of inference instances are the passive instances.

6. The thread optimization system of claim 1, wherein the functions further comprise:

generating the predetermined model profiles using a profiler component of the thread optimization system, the predetermined model profiles being generated using only powers of 2 for the batch sizes of the predetermined model profiles.

7. The thread optimization system of claim 1, wherein the batch size is estimated using a batch-size estimator of the thread optimization system, the batch-size estimator being integrated into a base serving system of the model serving system and configured to intercept incoming inference requests and estimate the batch size based on the intercepted inference requests.

8. A method of optimizing thread allocation for a model serving system, the method comprising:

estimating a batch size for inference requests of the model serving system using a batch size estimator component of a thread optimization system of the model serving system, the model serving system serving a deep learning model and including a plurality of threads corresponding to a total thread count for processing inferences for the deep learning model;

automatically determining, using an optimizer component of the thread optimization system, a first optimal configuration that defines a number of inference instances, a number of threads per inference instance, and a sub-batch size per inference instance for processing a batch of inference requests of the batch size using intra-operator parallelism with the plurality of threads that minimizes average per-batch latency, the first optimal configuration being determined with reference to a plurality of predetermined model profiles that define single-inference average batch latencies for different combinations of thread counts and batch sizes, the predetermined model profiles being used as input to a dynamic programming algorithm that identifies optimal configurations that minimize the average per-batch latency; and allocating compute resources based on the number of inference instances, the number of threads per inference instance, and the sub-batch size per inference instance indicated by the first optimal configuration.

9. The method of claim 8, wherein the dynamic programming algorithm is a 2-dimensional knapsack problem with a first dimension corresponding to a number of cores available for processing the inference requests for the model serving system and a second dimension corresponding to the batch size, wherein the predetermined model profiles correspond to fill items for the 2-dimensional knapsack problem and weights of the fill items correspond to thread counts and batch sizes associated with respective predetermined model profiles, and wherein a goal of the 2-dimensional knapsack problem is to find a set of fill items that minimizes the average batch latency across model instances while keeping a total weight of the fill items to a size of a knapsack.

10. The method of claim 8, further comprising:

dispatching the inference requests to the inference instances based on the optimal configuration using a dispatching component of the thread optimizing system.

11. The method of claim 8, further comprising:

triggering a configuration change when a different batch size for the inference requests is detected, the configuration change including:

automatically determining, using the optimizer component of the thread optimization system, a second optimal configuration that defines a number of inference instances, a number of threads per inference instance, and a sub-batch size per inference instance for processing a batch of inference requests of the different batch size using intra-operator parallelism; and allocating the compute resources based on the number of inference instances, the number of threads per inference instance, and the sub-batch size per inference instance indicated by the second optimal configuration.

12. The method of claim 11, wherein the second optimal configuration indicates a change in the number of threads per inference instance, and further comprising:

activating a first set of inference instances as active instances for the first optimal configuration, and activating a second set of inference instances as passive instances for the first optimal configuration; and in response to triggering the configuration change, configuring the second set of inference instances based on the second optimal configuration and swapping the second set of inference instances with the first set of inference instances such that the second set of inference instances are the active instances and the first set of inference instances are the passive instances.

13. The method of claim 8, further comprising:

generating the predetermined model profiles using a profiler component of the thread optimization system, the predetermined model profiles being generated using only powers of 2 for the batch sizes of the predetermined model profiles.

14. The method of claim 8, wherein the batch size is estimated using a batch-size estimator of the thread optimization system, the batch-size estimator being integrated into a base serving system of the model serving system and configured to intercept incoming inference requests and estimate the batch size based on the intercepted inference requests.

15. A non-transitory computer readable medium on which are stored instructions that, when executed, cause a programmable device to perform functions of:

estimating a batch size for inference requests of a model serving system using a batch size estimator component of a thread optimization system of the model serving system, the model serving system serving a deep learning model and including a plurality of threads corresponding to a total thread count for processing inferences for the deep learning model;

automatically determining, using an optimizer component of the thread optimization system, a first optimal configuration that defines a number of inference instances, a number of threads per inference instance, and a sub-batch size per inference instance for processing a batch of inference requests of the batch size using intra-operator parallelism with the plurality of threads that minimizes average per-batch latency, the first optimal configuration being determined with reference to a plurality of predetermined model profiles that define single-inference average batch latencies for different combinations of thread counts and batch sizes, the predetermined model profiles being used as input to a dynamic programming algorithm that identifies optimal configurations that minimize the average per-batch latency; and allocating compute resources based on the number of inference instances, the number of threads per inference instance, and the sub-batch size per inference instance indicated by the first optimal configuration.

16. The non-transitory computer readable medium of claim 15, wherein the dynamic programming algorithm is a 2-dimensional knapsack problem with a first dimension corresponding to a number of cores available for processing inference requests for the model serving system and a second dimension corresponding to the batch size, wherein the predetermined model profiles correspond to fill items for the knapsack problem and weights of the fill items correspond to thread counts and batch sizes associated with respective predetermined model profiles, and wherein a goal of the knapsack problem is to find a set of fill items that minimizes the average batch latency across model instances while keeping a total weight of the fill items to a size of the knapsack.

17. The non-transitory computer readable medium of claim 15, further comprising:

dispatching inference requests to the inference instances based on the optimal configuration using a dispatching component of the thread optimizing system.

18. The non-transitory computer readable medium of claim 15, further comprising:

triggering a configuration change when a different batch size for inference requests is detected, the configuration change including:

automatically determining, using the optimizer component of the thread optimization system, a second optimal configuration that defines a number of inference instances, a number of threads per inference instance, and a sub-batch size per inference instance for processing a batch of inference requests of the different batch size using intra-operator parallelism; and allocating the compute resources based on the number of inference instances, the number of threads per inference instance, and the sub-batch size per inference instance indicated by the second optimal configuration.

19. The non-transitory computer readable medium of claim 18, wherein the second optimal configuration indicates a change in the number of threads per inference instance, and further comprising:

activating a first set of inference instances as active instances for the first optimal configuration, and activating a second set of inference instances as passive instances for the first optimal configuration; and in response to triggering the configuration change, configuring the second set of inference instances based on the second optimal configuration and swapping the second set of inference instances with the first set of inference instances such that the second set of inference instances are the active instances and the first set of inference instances are the passive instances.

20. The non-transitory computer readable medium of claim 15, further comprising:

generating the predetermined model profiles using a profiler component of the thread optimization system, the predetermined model profiles being generated using only powers of 2 for the batch sizes of the predetermined model profiles.

* * * * *